(12) United States Patent
Pettersson et al.

(10) Patent No.: US 8,144,981 B2
(45) Date of Patent: Mar. 27, 2012

(54) TEXTURE COMPRESSION BASED ON TWO HUES WITH MODIFIED BRIGHTNESS

(75) Inventors: Martin Pettersson, Vallentuna (SE); Jacob Ström, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 903 days.

(21) Appl. No.: 12/064,207

(22) PCT Filed: Jul. 14, 2006

(86) PCT No.: PCT/SE2006/000885
§ 371 (c)(1),
(2), (4) Date: Aug. 6, 2008

(87) PCT Pub. No.: WO2007/021227
PCT Pub. Date: Feb. 22, 2007

(65) Prior Publication Data
US 2009/0003692 A1    Jan. 1, 2009

Related U.S. Application Data

(60) Provisional application No. 60/709,432, filed on Aug. 19, 2005.

(51) Int. Cl.
*G06K 9/36* (2006.01)
*G06K 9/00* (2006.01)

(52) U.S. Cl. ........................................ 382/166; 382/162

(58) Field of Classification Search .................. 382/166, 382/232–253, 162, 167, 108, 100; 345/581–604, 345/420–427; 348/234, 256, 222.1, 235, 348/237, 254, 255, 645, 312; 358/539, 426.01–426.16, 1.9, 518; 375/240.01–240.29
See application file for complete search history.

(56) References Cited

U.S. PATENT DOCUMENTS

| | | | |
|---|---|---|---|
| 6,128,406 A * | 10/2000 | Ostrovsky | 382/166 |
| 6,937,250 B1 * | 8/2005 | Schilling et al. | 345/582 |
| 7,693,337 B2 * | 4/2010 | Strom et al. | 382/233 |
| 7,734,105 B2 * | 6/2010 | Strom et al. | 382/239 |
| 7,751,630 B2 * | 7/2010 | Strom et al. | 382/232 |
| 7,787,691 B2 * | 8/2010 | Strom | 382/166 |

* cited by examiner

*Primary Examiner* — Ishrat I Sherali

(57) ABSTRACT

In an image-encoding scheme, an input image is decomposed into image blocks comprising multiple image elements. The image blocks are then encoded into encoded blocks. An encoded block comprises a first color codeword, a second color codeword, a color modifier codeword and a color index sequence. The color codewords are representations of a first and second base color located on a first line in color space. The modifier codeword is a representation of at least one color modifier for modifying the first base color along a second line to obtain multiple color representations along the line. The second line has a different direction as compared to the first line. The index sequence comprises color indices associated with a color representation selected form i) the representations on the second line and ii) at least one representation based on the second base color.

38 Claims, 17 Drawing Sheets

US 8,144,981 B2

TEXTURE COMPRESSION BASED ON TWO HUES WITH MODIFIED BRIGHTNESS

This application claims the benefit of U.S. Provisional Application No. 60/709,432, filed Aug. 19, 2005, the disclosure of which is fully incorporated herein by reference.

TECHNICAL FIELD

The present invention generally refers to image processing, and in particular to methods and systems for encoding and decoding images.

BACKGROUND

The real-time rendering of three-dimensional graphics has a number of appealing applications on mobile terminals, including games, man-machine interfaces, messaging and m-commerce. Since three-dimensional rendering is a computationally expensive task, dedicated hardware must often be built to reach sufficient performance. Innovative ways of lowering the complexity and bandwidth usage of this hardware architecture are thus of great importance.

The main bottleneck, especially for mobile phones, is memory bandwidth. A common technique for reducing memory bandwidth usage is texture compression. Texturing refers to the process of "gluing" images (here called textures) onto the rendered triangles. If the textures are compressed in memory, and then during accessing they are decompressed, a significant amount of bandwidth usage can be avoided.

There are several texture compression schemes available today, and the most practical ones are protected by patents.

The S3TC (also called DXTC) scheme is the most popular [1]. It uses 64 bits per 4×4 pixels, and the rate is 4 bits per pixel (bpp). During decompression, two base colors (stored in 16 bits) are used, and in between these (in red, green, blue, RGB, space), two more colors are interpolated. This gives a color palette of four colors. Each pixel in the 4×4 block then stores a 2-bit index into the local color palette. During the interpolation of the two more colors, multiplication by $\frac{1}{3}$ and $\frac{2}{3}$ is performed, which is not ideal in hardware. In addition, the compression using S3TC is relatively time consuming.

Recently, Ström and Akenine-Möller [2] presented a texture compression scheme called PACKMAN. It encodes a block of 2×4 texels into 32 bits. Only one color is possible per block, but in each pixel this color can be modified in intensity. The major goal of PACKMAN was to allow for minimal decompression complexity, and this goal was reached. However, the quality was about 2.5 dB worse than S3TC in terms of Peak Signal to Noise Ratio (PSNR). The major problem in terms of quality was the fact that the chrominance was so heavily quantized. This introduced block artifacts.

In order to mitigate this, Ström and Akenine-Möller introduced an improved version of PACKMAN, called iPACKMAN or Ericsson Texture Compression (ETC) [3, 4]. The main trick was to code two 2×4 blocks in common, which allowed for differential encoding of the colors. This made it possible to have finer quantization of the colors, which resulted in an increased quality: of 3 dB. This quality increase came at the cost of some hardware complexity, though iPACKMAN/ETC is most likely still lower in terms of complexity than S3TC.

Even though iPACKMAN/ETC provides a high quality in terms of PSNR, it is still desirable to provide an image processing that can either be employed alone or be used as a complement for improving the iPACKMAN/ETC scheme. This image processing should in particular be adapted for managing those images for which iPACKMAN/ETC produces artifacts that are clearly visible for the viewer.

SUMMARY

The present invention overcomes these and other drawbacks of the prior art arrangements.

It is a general object of the present invention to provide image encoding and image decoding methods and system.

It is another object of the invention to provide such methods and systems applicable for processing image blocks comprising two distinct hues.

These and other objects are met by the invention as defined by the accompanying patent claims.

Briefly, the present invention involves image processing in the form of encoding (compressing) an image and decoding (decompressing) an encoded (compressed) image.

According to the invention, an image to be encoded is decomposed into a number of image blocks comprising multiple image elements (pixels, texture elements, texels, or volume elements, voxels). An image block preferably comprises sixteen image elements and has a size of $2^m \times 2^n$ image elements, where m=4−n and n=0, 1, 2, 3, 4 or $2^m \times 2^n 2^p$ image elements, where m, n, p=0, 1, 2, 3, 4 with the proviso that m, n, p are not all zero. Each image element in a block is characterized by a color, e.g. a 24-bit RGB (red, green, blue) color. The image blocks are then encoded.

In this lossy block encoding, a first color codeword is determined as a representation of a first base color. A second color codeword is also determined as a representation of a second base color. The first and second base colors are located on a first line in color space having a first direction.

A color modifier codeword is provided as a representation of at least one color modifier applicable for modifying the first base color along a second line having a second direction in color space to obtain multiple color representations along this second line. The second direction is different from the first direction.

A color index is selected for preferably each image element in the image block. This color index is associated with a color representation selected from i) the multiple color representations along the second line and ii) at least one color representation based on the second base color.

This image compression is particularly suitable for handling image block having two distinct hues or chrominances and where the original colors of the image elements are distributed around these two chrominance values.

During decoding, the encoded image block(s) that should be decoded is (are) identified and fetched from e.g. a memory location. Once the correct encoded image block is identified the first and second base colors are determined based on the two color codewords. The color modifier codeword is employed for providing the at least one color modifier which is used for modifying the first base color along the second line to generate multiple color representations along this second line. The color index sequence can then be used for selecting, for each image element to be decoded, a color representation from i) the multiple color representations along the second line and ii) at least one color representation based on the second base color.

The present invention relates to methods and systems for encoding/compressing and decoding/decompressing images and image blocks, a user terminal comprising such a system and a signal representation of an image block as defined by the independent claims.

BRIEF DESCRIPTION OF THE DRAWINGS

The invention together with further objects and advantages thereof, may best be understood by making reference to the following description taken together with the accompanying drawings, in which.

DETAILED DESCRIPTION

Figure 1:
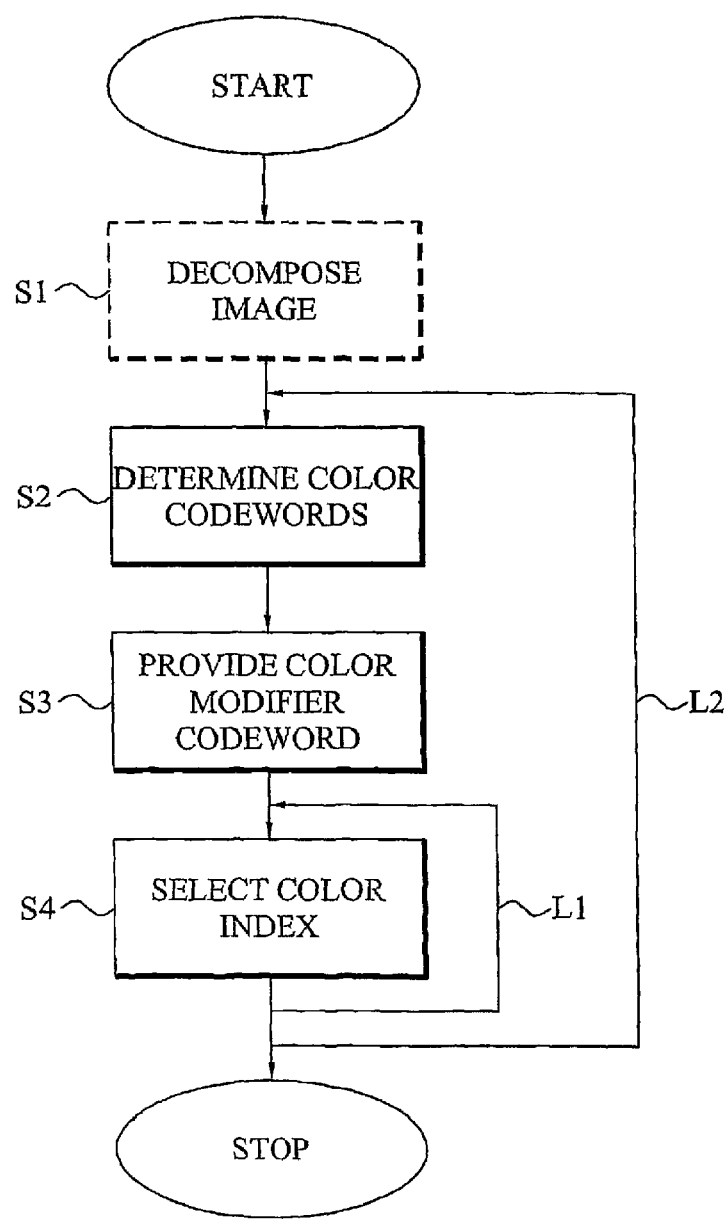
FIG. 1 is a flow diagram illustrating an image encoding method and image block compressing method according to the present invention.

Throughout the drawings, the same reference characters will be used for corresponding or similar elements.

The present invention relates to image and graphic processing, and in particular to encoding or compressing images and image blocks and decoding or decompressing encoded (compressed) images and image blocks.

Generally, according to the invention, during image encoding, an image is decomposed or divided into a number of image blocks. Each such image block then comprises multiple image elements having, among others, a certain color. The image blocks are encoded or compressed to generate an encoded/compressed representation of the image.

When an encoded image or graphic primitive subsequently is to be rendered, e.g. displayed on a screen, the relevant image elements of the encoded image blocks are identified and decoded. These decoded image elements are then used to generate a decoded representation of the original image or graphics primitive.

The present invention is well adapted for usage with three-dimensional (3D) graphics, such as games, 3D maps and scenes, 3D messages, e.g. animated messages, screen savers, man-machine interfaces (MMIs), etc., but is not limited thereto. Thus, the invention could also be employed for encoding other types of images or graphics, e.g. one-dimensional (1D), two-dimensional (2D) or 3D images.

In 3D graphics processing, typically several triangles are created and the corresponding screen coordinates of the corners of these triangles are determined. Onto each triangle, an image (or portion of an image), or a so-called texture, is mapped ("glued"). The management of textures is, though, costly for a graphic system, both in terms of utilized memory for storage of textures and in terms of memory bandwidth during memory accesses, when textures are fetched from the memory. This is a problem particularly for thin clients, such as mobile units and telephones, with limited memory capacity and bandwidth. As a consequence, a texture or image encoding scheme is often employed. In such a scheme, a texture is typically decomposed or divided into a number of image blocks comprising multiple texels. The image blocks are then encoded and stored in a memory. Note that the size of an encoded (version of an) image block is smaller than the corresponding size of the uncoded version of the image block.

In the present invention the expression "image element" refers to an element in an image block or encoded representation of an image block. This image block, in turn, corresponds to a portion of an image or texture. Thus, according to the invention, an image element could be a texel (texture element) of a (1D, 2D, 3D) texture, a pixel of a (1D or 2D) image or a voxel (volume element) of a 3D image. Generally, an image element is characterized by certain image-element properties, such as a color value. Furthermore, in the following, the term "image" is used to denote any 1D, 2D or 3D image or texture that can be encoded and decoded by means of the present invention, including but not limited to photos, game type textures, text, drawings, high dynamic range images and textures, etc.

The present invention provides an image processing that is in particular suitable for compressing and decompressing images and image blocks with two distinct chrominances or hues per image block. In a preferred implementation, the image processing of the invention is useful as an auxiliary mode to an image processing scheme comprising one default mode and at least one auxiliary mode. In such a case, the image processing of the invention can be used for handling those image blocks having two distinct hues, whereas the default mode or another auxiliary mode is used for image blocks having other color distributions and patterns.

Compression

Figure 2:
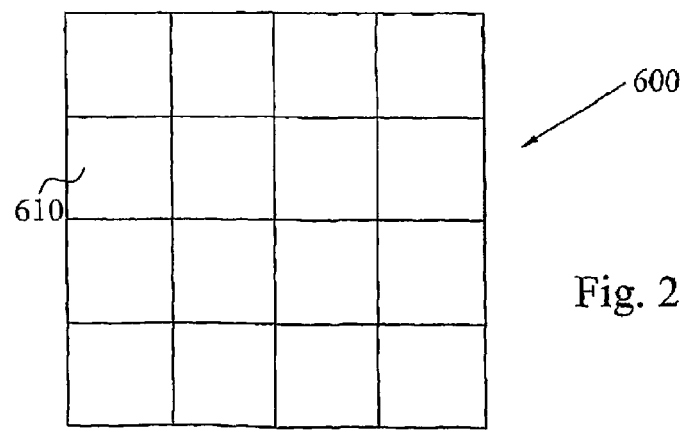
FIG. 2 illustrates an embodiment of an image block according to the present invention.

FIG. 1 illustrates a (lossy) method of encoding an image according to the present invention. In a first step S1, the image is decomposed or divided into a number of image blocks. Each such image block comprises multiple, i.e. at least two, image elements. In a preferred embodiment of the invention, an image block comprises sixteen image elements (pixels, texels or voxels) and has a size of $2^m \times 2^n$ image elements, where m=4−n and n=0, 1, 2, 3, 4. More preferably, m and n are both 2. It could also be possible to utilize an image block of size $2^m \times 2^n$ or $2^m \times 2^n \times 2^p$ image elements, where m, n, p are zero or positive integers with the proviso that not all of m, n, p may simultaneously be zero. FIG. 2 schematically illustrates an example of an image block 600 with sixteen image elements 610 according to the present invention. In an alternative embodiment of the present invention, the image is decomposed into a number of image sub-blocks, preferably having a size of 2×4 or 4×2 image elements. In such a case, two such sub-blocks could be handled together during compression to form a 4×4 block 600 as illustrated in FIG. 2. Returning to FIG. 1, the whole image block is preferably decomposed into (non-overlapping) image blocks in step S1. However, in some applications, only a portion of an image is encoded and, thus, only this portion is decomposed into image blocks.

The following steps S2 and S4 perform an encoding or compression of the image blocks. Firstly, in step S2, a first and a second color codeword are determined. The first color codeword is a representation of a first base color and the second color codeword is likewise a representation of a second base color. These two base colors are located on a first line in color space, where the first line has a first direction.

In a preferred embodiment, the colors of the image elements in the block to be compressed are RGB (Red, Green, Blue) colors. In such a case, the two base colors are preferably also two RGB colors and therefore the two color codewords determined in step S2 represent two color points in the RGB color space. However, the present invention can also be used for any other proprietary color space commonly used in image and graphics processing and management, including a YUV space or YCrCb space. The color codewords are preferably in the same color format (space) as the image. However, in some cases, it may be useful to convert the image to a different color format, i.e. having the color codewords in a first color space and the original image in a second different color space.

In a preferred implementation of the present invention, the original colors of the image elements in the block consist of three color components, such as red, green and blue. In a further preferred implementation, these original colors are in the format RGB888, implying that 8 bits are spent per color component and that such a color component can have value in the interval of to 255. Correspondingly, the first and second base colors are then preferably in the format of RGB888. In alternative embodiment, the original color components are represented as floats or half floats.

The first and second color codewords typically comprise multiple color components, preferably the same color components as the original colors of the image elements, such as RGB. However, compared to the original colors, the color codewords are preferably in a quantized form, such as RGBXYZ, where at least one of X, Y, Z is smaller than 8. For example, the two color codewords can be in the format RGB555, RGB554 or RGB444. This means that the first and second color codewords could then be regarded as quantized representations of the first and second base colors, respectively. During decompression the base color values in the format RGB888 can be obtained by extending or expanding the color codewords, which will be described further herein.

In a next step S3, a color modifier codeword is provided. This modifier codeword is a representation of at least one color modifier that is applicable, during image block decompression, for modifying the first base color represented by the first color codeword along a second line in color space. This second line has a second direction and the second direction is different from the first direction. In other words, the first and second lines are two separate lines in color space and are, in addition, two non-parallel lines in color space. This means that if the two lines intersect, they do so at minimum angle α, where $0° < \alpha \leq 90°$.

By modifying the first base color along the second line using the at least one color modifier represented by the modifier codeword provided in step S3, multiple color representations or paint colors are obtained along the second line. Corresponding to the discussion above, if the original colors of the image elements in the block and preferably the first and second base color are RGB colors, the obtainable multiple color representations are preferably also RGB colors.

In a next step S4, a color index is selected for a current image element in the image block. This color index is associated with a color representation selected from a color representation set comprising i) the multiple color representations obtainable by modifying the first base color with the at least one color modifier along the second line and ii) at least one color representation that is based on the second base color. In this step S4, thus, a color representation is selected for an image element in the block and is used as representation of the "true" original color of that image element. According to the present invention, the color representation to use for an image element can, thus, be selected from color representations obtainable from the first base color (and found on the second line) and one or more color representations based on the second base color. This means that the available color representations to select from can be regarded as divided into two sets. A first set comprises color representations obtainable from the first base color and are present on the second line. A second set instead comprises color representations obtainable from the second base color. Note that the first set may actually include the first base color as an available color representation and/or the second set may include the second base color as available color representation.

Figure 3:
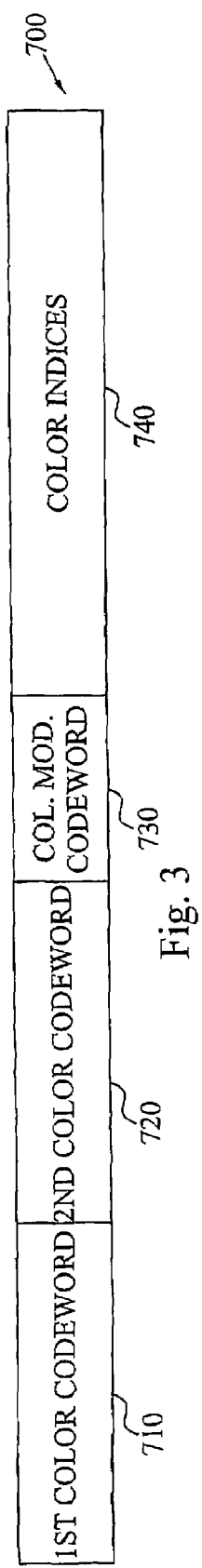
FIG. 3 illustrates an embodiment of an encoded representation of an image block according to the present invention.

Step S4 is preferably repeated for all image elements in the image block (schematically illustrated by line L1). The result of the encoding of steps S2 to S4 is an encoded image block or more precisely an encoded (compressed) representation of the image block. Such an encoded block representation 700 is illustrated in FIG. 3. The representation 700 (encoded image block) comprises the first color codeword 710, the second color codeword 720, the color modifier codeword 730 and a sequence or bitmap 730 of color indices (preferably one color index for each image element in the block). Note that the mutual order of the first color codeword 710, the second codeword 720, the color modifier codeword and the color index sequence 740 of the encoded image block 700 may differ from what is illustrated in the figure.

Returning to FIG. 1, steps S2 to S4 are preferably repeated for all image blocks provided during the decomposing of step S1 (schematically illustrated by line L2). The result is then a sequence or file of encoded image blocks. The resulting encoded image blocks (encoded representations of the image blocks) could be ordered in a file from left to right and top to bottom in the same order in which they were broken down in the block decomposing of step S1. The method then ends.

The encoded image could then be provided to a memory for storage therein until a subsequent rendering, e.g. display, of the image. Furthermore, the encoded image could be provided as a signal of encoded block representations to a transmitter for (wireless or wired) transmission to another unit.

Figure 4A:
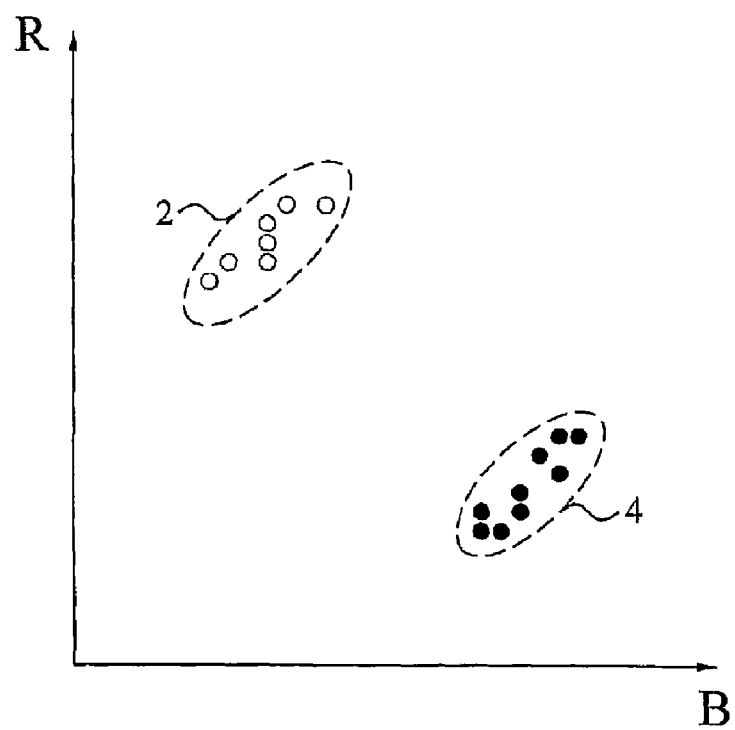
FIG. 4A is a diagram illustrating the distribution of colors of image elements of an image block that advantageously can be compressed according to the present invention.

FIG. 4A is a diagram illustrating a portion of the RGB space, represented by the RB plane of the RGB space in order to simplify the figure. In this diagram, sixteen color points have been marked as grey or black filled circles. These color points represent the original colors of an image block that is advantageously compressed according to the present invention. As was noted in the foregoing, the present invention is particularly adapted for handling (compressing and decompressing) image blocks where the original colors of the included image elements generally have two distinct hues or chrominances. This happens, for example, if the original color can be grouped into two color groups 2, 4 as illustrated in FIG. 4A. The colors of two color points within such a color group 2, 4 are relatively close in color space, whereas the colors of two color points belonging to different groups 2, 4 are much more distant.

Figure 4B:
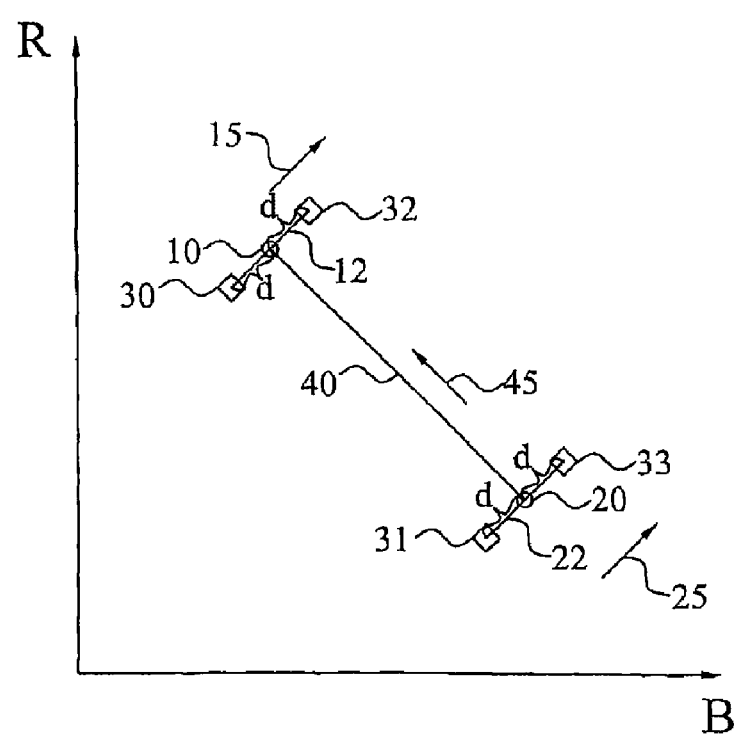
FIG. 4B is a diagram illustrating color representations generated according to the present invention and suitable for representing the colors of the image elements illustrated in FIG. 4A.

FIG. 4B is a corresponding diagram of the same portion of RGB space as in FIG. 4A and illustrates how the present invention can be used for representing the sixteen original colors of the two color groups in FIG. 4A. According to the present invention, the first color codeword is determined to be a representation of a first base color 10 useful for representing the first color group 2. Correspondingly, the second color codeword is determined to be a representation of a second base color 20 useful for representing the second color group 4. In the figure, it is evident that the first 10 and second 20 base colors are present on a first line 40 having a first direction 45 in color space. In FIG. 4B, this direction 45 has non-limitedly been illustrated with a vector 45 pointing from the second base color 20 and towards the first base color 10. This should however merely be seen as an illustrative example and the direction 45 may actually be opposite to what is illustrated in the figure, i.e. with a vector pointing from the first base color 10 and towards the second base color 20.

The color modifier codeword is in this embodiment of the present invention a representation of i) at least one color modifier applicable for modifying the first base color 10 along a second line 12 having a second direction 15 in color space and ii) at least one color modifier applicable for modifying the second base color 20 along a third line 22 having a third direction 25 in color space.

The modification of the first base color 10 along the second line 12 results in multiple, two in the figure, color representations 30, 32 along the second line 12. Correspondingly, modification of the second base color 20 along the third line 22 results in multiple, two in the figure, color representations 31, 33 along the third line 22. In a preferred embodiment, the second line 12 (third line 22) intersects the first line 40 at the point where the first base color 10 (second base color 20) is located on the first line 40. This in turn means that the first base color 10 is preferably located on the second line 12 in addition to the first line 40 and that the second base color 20 is located, in this embodiment, on both the first 40 and third 22 lines. As is also evident from the figure, the third line 22 is different from the second line 12 but may possible have a same direction 25 in color space as the first line 12. Thus, the third 22 and second 12 lines could be parallel.

The two color representations 30, 32 on the second line 12 are preferably situated on either side of the first base color 10 on this line and the two representations 31, 33 on the third line 22 are, correspondingly, preferably situated on either side of the second base color 20 on the third line 22.

In this illustrative example, four color representations 30, 31, 32, 33 are, thus, available for representation of the sixteen original colors of the image elements. In a typical real case, the image elements having colors present in the first group 2 in FIG. 4A, are typically assigned a color index associated with either of the color representations 30, 32 present on the second line 12 and derived from the first base color 10. Correspondingly, image elements in the block having colors in the second group 4 of FIG. 4A will typically be assigned a color index associated with color representation 31 or 33 on the third line 22 and derivable from the second base color 20. Thus, the two color representations 30, 32 are good approximations of the color points in the first color group 2 but not of color points present in the second color group 4. However, for the latter, the two color representations 31, 33 are good approximations.

This means that an image block having two distinct hues as illustrated in FIG. 4A can advantageously be processed according to the present invention. As is seen FIG. 4B, the lines 12, 22 between the color representations 30, 31, 32, 33 and the line 40 between the two base colors 10, 20 collectively form a H. As a consequence, this embodiment of the present invention is denoted H pattern or H mode herein.

Figure 5A:
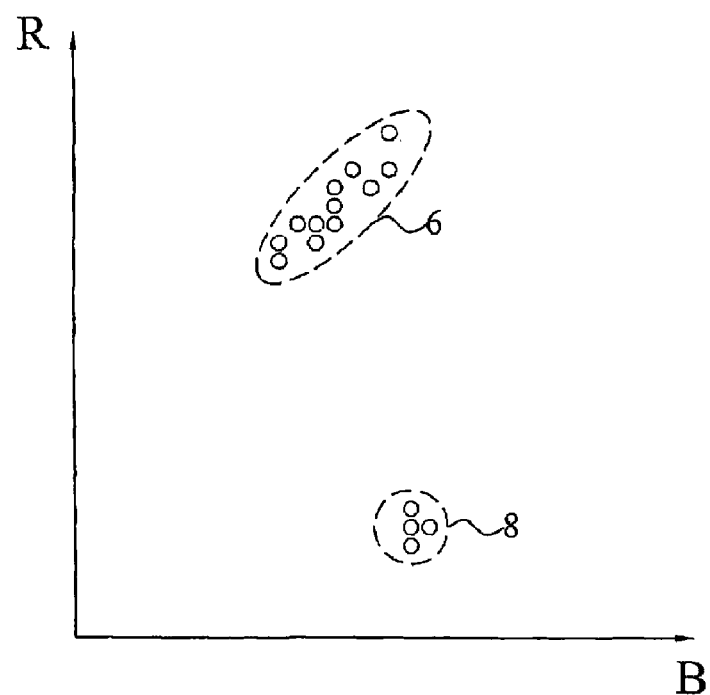
FIG. 5A is a diagram illustrating the distribution of colors of image elements of another image block that advantageously can be compressed according to the present invention.

FIG. 5A is a corresponding diagram of the RB-plane portion of the RGB space. Compared to FIG. 4A, a first color group 6 comprises more color points and these color points are distributed in an elongated elliptical set 6. However, the color points of a second color group 8 are distributed around and close to a color point. In this case, the modification of the first base color described above to obtain two color representations would typically be a reasonable approximation of the colors of the first color group 6. However, applying such a procedure also for the second base color to obtain two color representations would typically be wasteful since the colors of the second color group 8 can be well represented with only a single color representation.

The present invention can, however, also be used for managing an image block having a color distribution as illustrated in FIG. 5A since also this block has two distinct color hues.

Figure 5B:
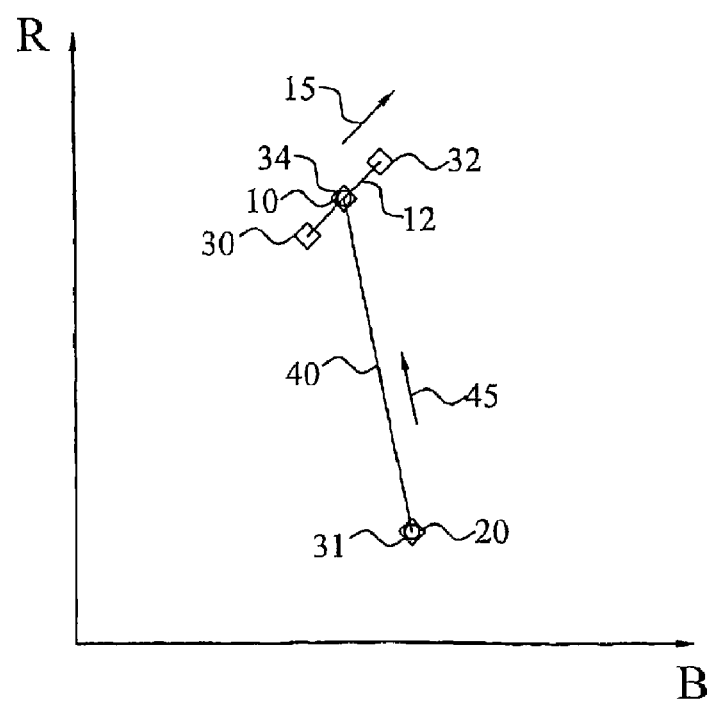
FIG. 5B is a diagram illustrating color representations generated according to the present invention and suitable for representing the colors of the image elements illustrated in FIG. 5A.

The results of such a color approximation and representation according this embodiment of the invention are presented in FIG. 5B. Similar to above, the first color codeword is determined to be a representation of a first base color 10, which base color 10 is typically found in or close to the first color group 6 in color space. Correspondingly, the second color codeword is determined to be a representation of a second base color 20, which is typically located in or close to the second color group 8. The two base colors 10, 20 are situated on a first line 40 having a first direction 45 in color space.

In this embodiment, the color modifier codeword is a representation of at least one color modifier applicable for modifying the first base color 10 along a second line 12 having a second direction 15 different from the first direction 45. This color modification results in three color representations 30, 32, 34 located on the second line 12. A first of these color representations 34 is actually the first base color 10. This means that for this representation the color modification gives the same output as input (first base color 10). The other two color representations 30, 32 are preferably situated on either side of the first color representation 34 (first base color 10) on the second line 12. This means that three color representations 30, 32, 34 are available as approximations for the image element colors of the first color group 6.

In this embodiment, a single color representation 31 is derived from the second base color 20, preferably being equal to the second base color 20. Thus, colors of the second color group 8 will then typically select a color index associated with this color representation 31.

Compared to the situation presented in FIGS. 4A and 4B, more color representations are provided in the area of the color space where the most image element colors are present at the expanse of providing fewer color representations in the vicinity of the second base color.

As is seen FIG. 5B, the lines 12 between the color representations 30, 32 and the line 40 between the two base colors 10, 20 collectively form a T. As a consequence, this embodiment of the present invention is denoted T pattern or T mode herein.

In an embodiment of the present invention, the color modifier codeword is a representation of a set of at least one color modifier that is used (during decoding) for modifying the color of the image elements in the image block. In a preferred implementation, the color modifier is used for modifying the luminance or intensity of the image elements in the image block.

In this embodiment of the invention, the color modifier codeword can be a table index allowing identification of a color modifier set. This index could then identify or point to the set in a table or codebook comprising several different color modifier sets. Each set comprises one or more color modifier values, preferably one or two modifier value.

The actual color modifier values of the sets in the table can be found by starting with random values and then optimizing these values using a number of different optimization schemes and algorithms, such as versions of the LBG-algorithm (Linde, Buzo and Gray) [5], simulated annealing and coordinate search, which are known to a person skilled in the art. A handful of images of different types e.g. photos, game type textures, text, etc., can be used as training data.

Table 1 illustrates a presently preferred example of a table comprising 7 sets of color modifiers, with one color modifier values in each set.

TABLE 1

Modifier table

| Set | Color modifier codeword | Color modifier value |
| --- | --- | --- |
| 0 | $000_{bin}$ | 3 |
| 1 | $001_{bin}$ | 6 |
| 2 | $010_{bin}$ | 11 |
| 3 | $011_{bin}$ | 16 |
| 4 | $100_{bin}$ | 23 |
| 5 | $101_{bin}$ | 32 |
| 6 | $110_{bin}$ | 41 |
| 7 | $111_{bin}$ | 64 |

If the table comprises at most 8 different intensity modifier set, the color modifier codeword is preferably a 3-bit index ($000_{bin}$-$111_{bin}$) identifying one of the (8) sets, e.g. [3] for codeword $000_{bin}$ (000 base 2), of the table.

The present invention is, though, not limited to usage of Table 1, but could use other tables with other color modifier sets and values. Furthermore, for more or less than 8 sets in a table, the size of the color modifier codeword might have to be changed. For example, if the table comprises two (3-4, or more than 8) color modifier sets, the codeword size could be limited to one bit (two bits, or more than three bits). In addition, in Table 1, each modifier set only comprises a single color modifier value. The present invention is, however, not limited thereto since the modifier set can include two, three, four or more modifier values.

In a preferred embodiment, the color modifier value in each set is a distance representation. Thus, the modifier value represents a distance to travel along the second line (or third line) in color space from the first base color (or second base color) to obtain a color representation on that line. If the set only comprises a single modifier value as illustrated by Table 1, the distance represented by a selected modifier value is preferably traveled along the second line (or third line) on either side of the first base color (second base color). Returning to FIG. 4B, in such a case the two color representations 30, 32 on the second line 12 are preferably positioned at a same distance d from the first base color 10 but on either side of the base color 10 on the line 12. The same applies to the two color representations 31, 33 on the third line 22.

The color modifier represented by the color modifier codeword can then represent this distance value d used in the color modification of the two base colors 10, 20.

It is anticipated by the present invention that the color modifier set represented by the color codeword can comprise two color modifiers, i.e. two different distance values d1 and d2. In such a case, the first distance value d1 can be used for modifying the first base color 10 along the second line 12 to obtain the two color representations 30, 32. The two color representations 31, 33 would then be obtained by modifying the second base color 20 along the third line 22 with the distance value d2.

Instead of using the first distance value d1 for only the first base color, this distance value d1 can be traveled along the second line 12 in the second direction 15 to obtain the color representation 32 and can be traveled along the third line 22 in the third direction 25 to obtain the color representation 33. Correspondingly, the other distance value d2 is used for obtaining the color representations 30, 31. This concept can of course be extended further so that the color modifier set represented by the color modifier codeword comprises four different distance values d1, d2, d3, d4, where the d1 and d2 is used for modifying the first base color 10 along the second line to obtain the color representations 30 and 32, respectively. The remaining two distance values d3, d4 are used together with the second base color 20 and the third direction 25 to obtain the two color representations 31, 33 along the third line.

In addition, the color modifier codeword does not have to be an index or pointer to a color modifier set in a table, but could actually be a color modifier set itself, e.g. comprises one distance value.

As is evident from the discussion above, the color modification is performed on both the base colors in the H mode but preferably only for the first base color in the T mode.

In another embodiment of the present invention, the color modifier codeword is a representation of a number of times a bit combination is shifted to obtain a modifier value, preferably a distance value. For example, the codeword can specify how many times the number $1_{bin}$ should be shifted leftwards to obtain the modifier value. In such a case, the available modifier values are according to Table 2 below.

TABLE 2

Shift table

| Color modifier codeword | Shift value | Color modifier value |
|---|---|---|
| $000_{bin}$ | $00000001_{bin}$ | 1 |
| $001_{bin}$ | $00000010_{bin}$ | 2 |
| $010_{bin}$ | $00000100_{bin}$ | 4 |
| $011_{bin}$ | $00001000_{bin}$ | 8 |
| $100_{bin}$ | $00010000_{bin}$ | 16 |
| $101_{bin}$ | $00100000_{bin}$ | 32 |
| $110_{bin}$ | $01000000_{bin}$ | 64 |
| $111_{bin}$ | $10000000_{bin}$ | 128 |

Thus, employing a 3-bit color modifier codeword and a shifting of the number $1_{bin}$ allows representation of the modifier values 1, 2, 4, 8, 16, 32, 64 and 128. This modifier value preferably represents the previously described distance value d, used for modifying the first base color along the second line to obtain two color representations and possibly modify the second base color along the third line, in the H mode, to obtain two color representations.

Both embodiments give similar performance and resulting image quality and the actual choice between hardware table and bit shifting can be a choice of (hardware) implementation.

Figure 6:
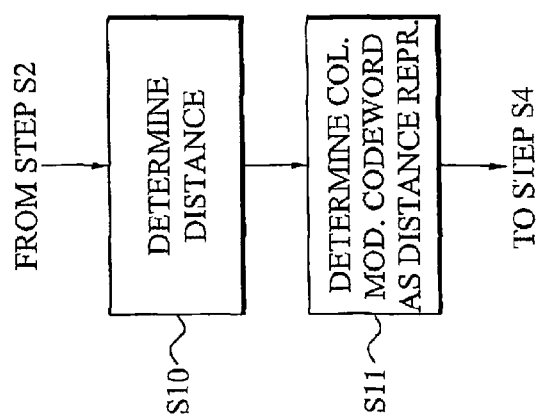
FIG. 6 is a flow diagram illustrating an embodiment of the providing step of FIG. 1 in more detail.

FIG. 6 is a flow diagram illustrating the codeword providing step of FIG. 1 in more detail. The method continues from step S2 of FIG. 1. In a next step S10, at least one distance value is determined. This at least distance one value is used for obtaining color representations based on the first base color (in H and T mode) and possible also color representations based on the second base color (in H mode). In a preferred implementation, a single distance value d is determined in step S10. However, for some applications two d1, d2 or even four d1, d2, d3, d4 or more could be determined in this step S10. The next step S11 determines the color modifier codeword as a representation of the distance value. In a first embodiment, the codeword is a table index to one of the multiple modifier sets each comprising one (or more) distance values. In a second embodiment, the codeword is a shift number specifying how many times a bit combination is shifted to obtain the distance value. The method then continues to step S4 of FIG. 1.

As has been described above and is illustrated in FIGS. 4B and 5B, the present invention can preferably be in the form of a multi-mode compression scheme, implying a selection between the H mode (FIG. 4B) and the T mode (FIG. 5B). In such a case, the H mode of the present invention is preferably used for image blocks where the original image element colors are distributed in two extended color clusters, see FIG. 4A. The T mode is then preferably employed if the image element colors are instead distributed in two color clusters and where the color points in one of the clusters are rather centralized around a single color point, see FIG. 5A. This means that the two modes of the present invention complement each other and can together handle many different image blocks having two distinct hues or chrominances.

Figure 7:
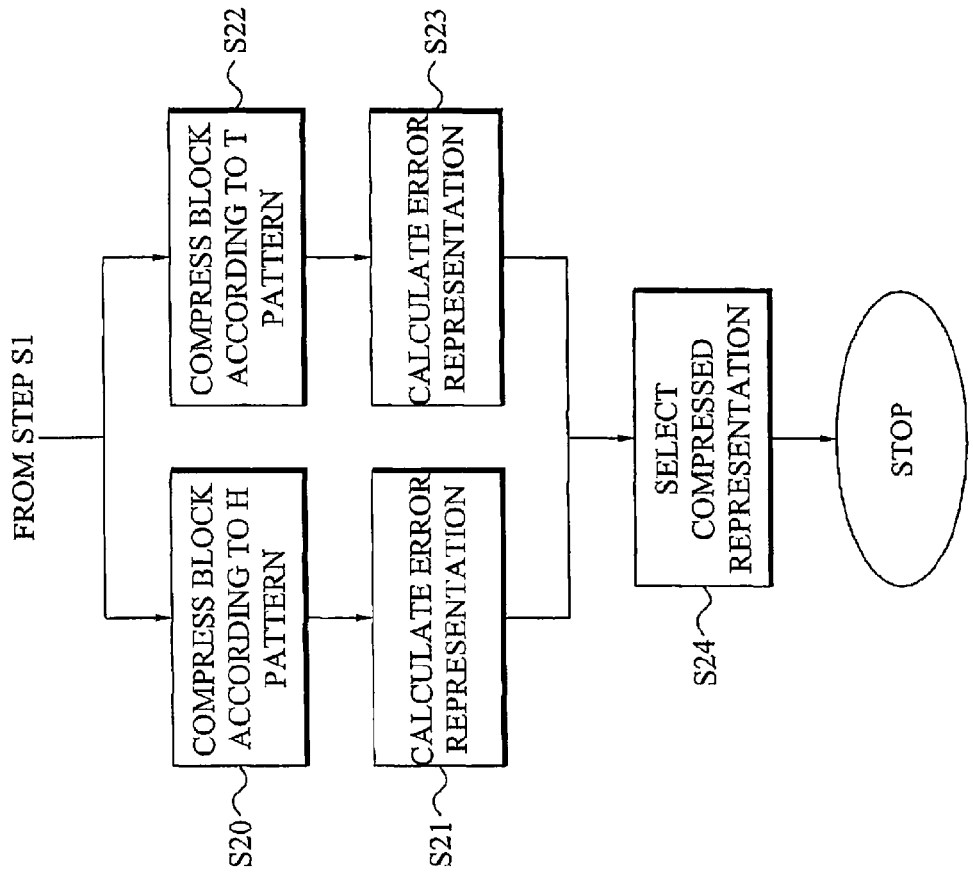
FIG. 7 is a flow diagram illustrating an embodiment of the providing and selecting steps of FIG. 1 in more detail for a multi-mode aspect of the invention.

FIG. 7 is a flow diagram illustrating the providing and selecting step of FIG. 7 in more detail according such a multi-mode implementation. The method continues from step S1 in FIG. 2. In a next step S20, the current image block is first compressed according to the H pattern or mode. This involves determining a first and second candidate color codewords as previously described. In addition, a candidate color modifier codeword is provided as a representation of i) at least one color modifier applicable for modifying the first base color represented by the first color codeword and ii) at least one color modifier applicable for modifying the second base color represented by the second color codeword. This color modification will result in at least two color representations along a second line, preferably passing through the first base color, and at least two color representations along a third different line, preferably passing through the second base color in color space. A color index associated with one of these at least four color representations is selected for preferably each image element in the image block.

In a next step S21, an error representation is calculated or at least estimated. This error is indicative of representing the image block with the compressed block determined according to the H mode in step S20, i.e. the two candidate color codewords, the candidate color modifier codeword and the candidate color index sequence. This error calculation can be performed by decompressing the compressed image block to obtain a decompressed version of the original image block and then comparing the obtained colors with the original colors of the image block, e.g. according to equation 1 below:

$$\varepsilon^2 = \sum_{y=0}^{3}\sum_{x=0}^{3}\left((R_{xy} - R_{xy}^O)^2 + (G_{xy} - G_{xy}^O)^2 + (B_{xy} - B_{xy}^O)^2\right) \quad (1)$$

where $R_{xy}^O$, $G_{xy}^O$, $B_{xy}^O$ represent the original red, green and blue color component of the original color for image element (x, y), respectively, $R_{xy}$, $G_{xy}$, $B_{xy}$ represent the red, green and blue color component of the assigned color representation for the image element (x, y), x=0, 1, 2, 3 and y=0, 1, 2, 3, and $\varepsilon^2$ is the calculated error representation.

Parallel or sequentially with the steps S20 and S21, the current image block is also compressed according to the T mode in step S22. This involves determining a first and second candidate color codeword as previously described. In addition, a candidate color modifier codeword is provided as a representation of at least one color modifier applicable for modifying the first base color represented by the first color codeword. This color modification will result in at least two color representations along a second line, preferably passing through the first base color. A color index associated with one of i) these at least two color representations, ii) the first base color and iii) the second base color is selected for preferably each image element in the image block.

In a next step S23, an error representation is calculated or at least estimated. This error is representative of representing the image block with the compressed block determined according to the T mode in step S22, i.e. the two candidate color codewords, the candidate color modifier codeword and the candidate color index sequence. This error calculation is performed in a similar manner to what was described above in connection to step S21.

In step S24, one of these two compressed representations is selected and used as compressed version of the current block. This selection step is performed based on the error values calculated in the steps S21 and S23. Thus, the compressed representation associated with the smallest error value is typically selected in step S23, i.e. either the block representation according to H mode or T mode. In a next optional step, a mode or pattern index representative of the compression mode used for generating the selected compressed representation is provided and is included in the compressed image block, i.e. in the bit sequence representing the image block. This procedure is preferably performed for each image block to be compressed. The method then ends.

This means that each image block of an image is preferably analyzed and compressed individually, which in most typical applications (depending on the actual image to be encoded), results in a mosaic of image blocks compressed according to the different modes. Thus, a first set of the image blocks is compressed according to the H mode, and a second remaining set of the blocks is compressed according to the T mode. For other applications only one of the modes will be used for the different image blocks.

In this embodiment, a compressed candidate block is generated per available compression mode. However, in another embodiment, the selection of compression mode to use for a current is block is performed prior to the actual block compressions. In such a case, a first analyzing step is performed where the original colors of the image elements in the block and in particular their distribution in color space is investigated and analyzed. The selection of compression mode is performed based on this analysis. This embodiment is possible since the two compression modes are adapted for somewhat different color distributions as is seen by comparing FIGS. 4A and 5A.

The analyzing embodiment has the advantage that only one and not two compressed candidate blocks need to be generated, though at the cost of a block and color analysis and a risk of selecting a non-optimal compression scheme.

As was noted in the foregoing, the steps S20-S21 and S22-S23 can be performed in parallel or sequentially. In a further embodiment, one of the H and T modes could be selected as default mode, implying that a current image block is firstly compressed according to that mode. In such a case, the method proceeds through steps S20 and S21, if the H mode is regarded as default mode, or through steps S22 and S23, if the T mode is the default mode. The resulting calculated error representation is then compared to a maximum allowed error value. If the calculated error is smaller than this maximum error, the compressed block determined according to the default (H or T) mode will be used as compressed representation of the image block without testing the other available mode. However, if the error representation exceeds the maximum error, the current image block is also compressed according to the other compression mode. This newly determined compressed block could then be used directly as compressed block representation. Alternatively, an error representation indicative of the compressed block is calculated and compared to the previously calculated error for the other mode. The representation resulting in a smallest error value is then typically selected and used for the current image block.

It is anticipated by the present invention that the image compression can be realized solely according to the H mode described above. In such a case, no selection between the H and T mode is required. In another embodiment, only the T mode described above are employed for all image blocks. In these two embodiments, no mode or pattern index is of course required in the resulting compressed image block. However, there is a preferably a choice between the two modes as disclosed in connection with FIG. 7.

Figure 8:
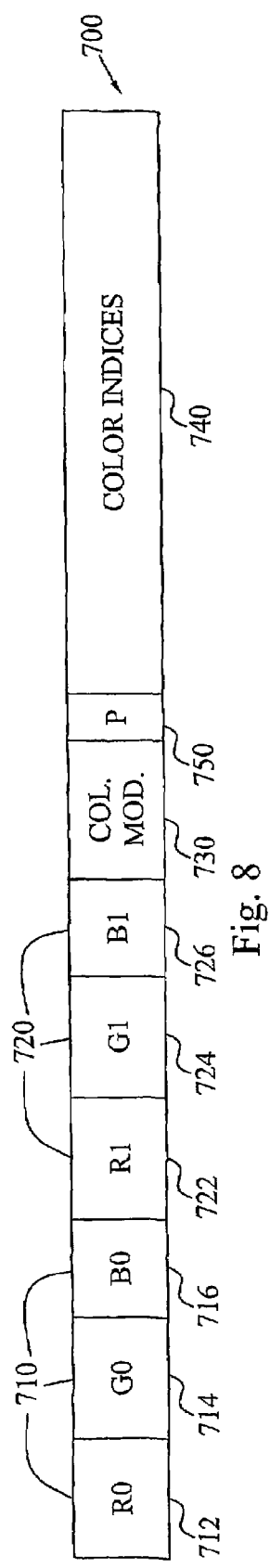
FIG. 8 illustrates another embodiment of an encoded representation of an image block according to the present invention.

FIG. 8 illustrates in more detail a compressed image block 700 determined according to the H or T mode of the present invention. This compressed block comprises the first 710 and second 720 color codewords, each comprising a red 712, 722, a green 714, 724 and a blue 716, 726 color component, respectively. The color modifier codeword 730 and the color index sequence 740 are also included in the compressed block 700. In order to discriminate between the H and T mode, a mode or pattern index 750 is preferably included in the compressed block 700. In a typical implementation, 14 bits can be spent per color codeword 710, 720, preferably 5 bits for the red 712, 722 and green 714, 724 components and 4 bits on the blue components 716, 726. The color modifier codeword 730 preferably includes 3 bits in this implementation and the color index sequence 740 comprises 16 2-bit color index, giving a total sequence size of 32 bits. In addition, the pattern index 750 can be one bit to discriminate between the two modes, such as $0_{bin}$ for the H (T) mode and $1_{bin}$ for the T (H) mode. This amounts in total to 64 bits for the image block and a compression rate of 4 bits per image element (bpp).

Generally, the problem of block compression is to find the best possible pair of base colors to use for an image block. In most typical practical applications, exhaustive search may not be feasible due to the number of combinations that have to be tested. For example, assuming the above-described codeword, sequence and mode index sizes, iterating over all possible base colors, 228 combinations; modes, 21 combinations; color modifier codewords, 23 combinations; and color indices, 22 combinations would be required. This means that up to 234 different combinations would have to be tried for each image element in the block. Therefore, for most practical implementations a non-exhaustive compression method is preferably used, such as one of the three methods described herein.

LBG Compression

LBG vector quantization algorithm [5] is used to find the two color codewords. As only two reconstruction values (the color codewords) are used, the algorithm converges quite fast. For example, starting with two random base colors, only ten iterations are most often needed to get a satisfying result. After the two base colors are found, all possible modes, color modifier codewords and color indices are tried, which requires only 26 different combinations for each image element in the block. The particular combination giving the lowest mean square error (MSE) is chosen for the image block. Using this approach for encoding a 512×512 texture takes less than five seconds using a 800 MHz PC with 256 MB or RAM.

Radius Compression

This method is slower than the LBG compression but will also give a better result in terms of image quality. Initially, the two candidate color codewords are determined using the LBG algorithm as described above. Then for each color codeword, all possible colors within a (2k+1)×(2k+1)×(2k+1) cube centered around candidate base colors represented by the candidate color codewords are tried. Loosely speaking, k can be called the radius of the cube, hence the name of this method. The encoding time increases very quickly with respect to k, while the gain in image quality is leveling off. Since there are two color codewords per image block and they are not tested independently, radius compression becomes $(2k+1)^6$ times slower than LBG compression. For instance, radius compression with k=1 is 729 times slower than LBG compression, k=2 is 15 625 times slower and so on. In practice, the extra encoding time for a radius level over two will not be justified by the small gain in quality. The gain in image quality using the first level of radius (k=1) is on average 1 dB in terms of peak signal to noise ration (PSNR), compared to LBG compression.

Selective Compression

Figure 15:
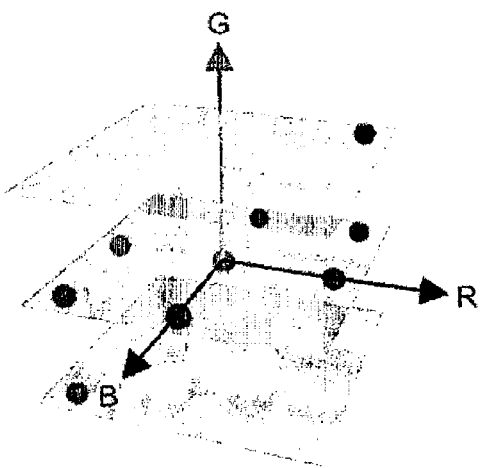
FIG. 15 schematically illustrates the distribution of frequent colors useful in a radius compression for determining a compressed representation of an image block.

This solution exploits the fact that all surrounding colors in radius compression are not equally probable. Empirical studies show that for almost all image blocks where the first radius level is used, it is sufficient to try only the color points shown in FIG. 15. This means that only nine different colors need to be tested for each color codeword instead of 27. Thus, the encoding time is decreased a factor nice compared to radius compression. The loss in image quality compared to radius compression is only about 0.05 dB.

Figure 9:
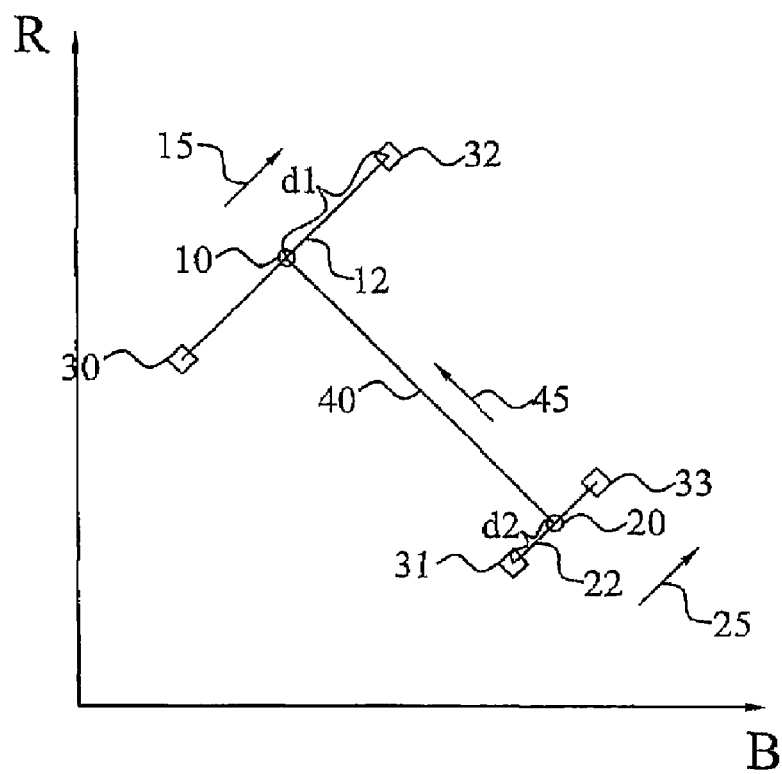
FIG. 9 is a diagram illustrating color representations that can be obtainable according to an embodiment of the invention.

FIG. 9 is a diagram of the RB portion of the RGB space illustrating another possible embodiment of the H mode according to the present invention. Compared to FIG. 4B, the color modifier codeword comprises in this case different color modifier values (distance values d1, d2) for modifying the first base color 10 as compared to the second base color 20. As is illustrated in the figure, the color modifier value d1 used for modifying the first base color 10, resulting in the two color representations 30, 32, along the second line 12 is comparatively larger than a corresponding color modifier value d2 used for modifying the second base color 20 along the third line to obtain the color representations 31, 33.

In this context, the color modifier codeword can be a representation of two different color modifier values d1, d2, such as being a table index to modifier set comprising these two modifier values. In an alternative implementation, the color modifier codeword is a representation of a single color modifier value, such as d2, and the other modifier value d1 can then be calculated from d2. For example, d1=h×d2, where h is pre-defined fixed constant, such as 2, or is defined in the compressed block representation.

As is illustrated in FIG. 9, the first modifier value d1 could in this embodiment be defined to always be larger than the second modifier value d2.

In FIG. 9, the second 12 and third 22 lines are parallel, i.e. the two directions 15 and 25 are the same. In a preferred such case, the second 15 and preferably also the third 25 directions are the luminance or intensity direction in color space, i.e. v=[1, 1, 1]. In such a case, the color modification of the two base colors 10, 12 can simply be realized by adding the color modifier values d1, d2 represented by the color modifier codeword to each color component of the base colors 10, 20, e.g. ($R_1$+d1, $G_1$+d1, $B_1$+d1), where $R_1$, $G_1$, $B_1$ represent the three color components of the first base color 10.

In another embodiment of the present invention, the second 12 and third 22 lines are parallel but their respective directions 15, 25 are not the luminance direction. In such a case, this direction 15, 25 could be pre-defined and the same for all image blocks compressed according to this H mode of the present invention. In an alternative embodiment, the direction can be encoded in the compressed image block to allow for different direction vectors for different image blocks. This means that the compressed image block can comprise a direction codeword.

Figure 10:
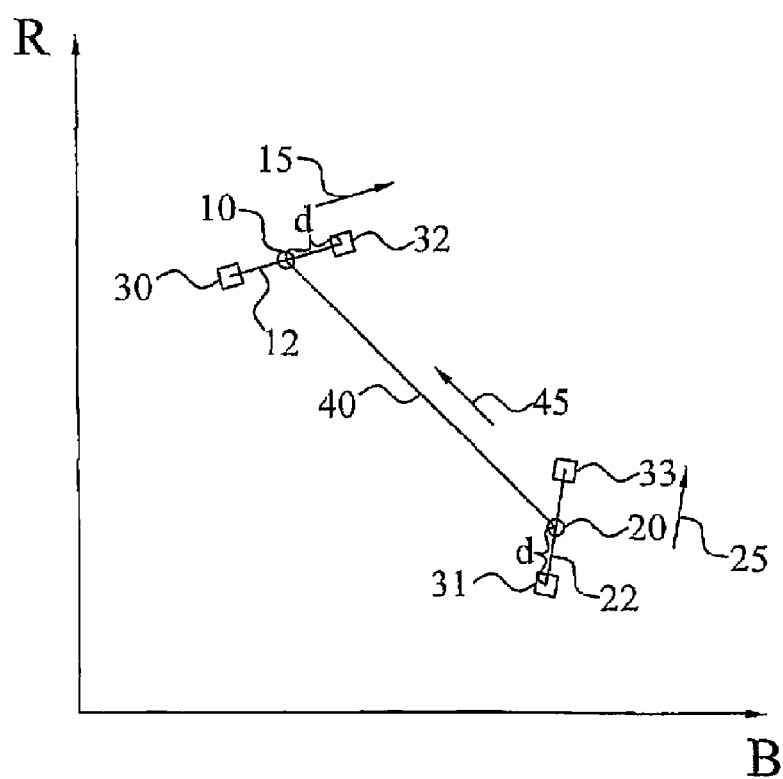
FIG. 10 is a diagram illustrating color representations that can be obtainable according to another embodiment of the invention.

This principle can be extended further, which is illustrated in FIG. 10. In this diagram, the second 12 and third lines 13 are non-parallel, i.e. the two direction vectors 15, 25 are different. In such a case, the two different directions 15, 25 can be pre-defined and typically the same for all blocks compressed according to such a mode. Alternatively, the one or both of the directions 15, 25 can be encoded in a direction codeword for the particular image block.

Figure 11:
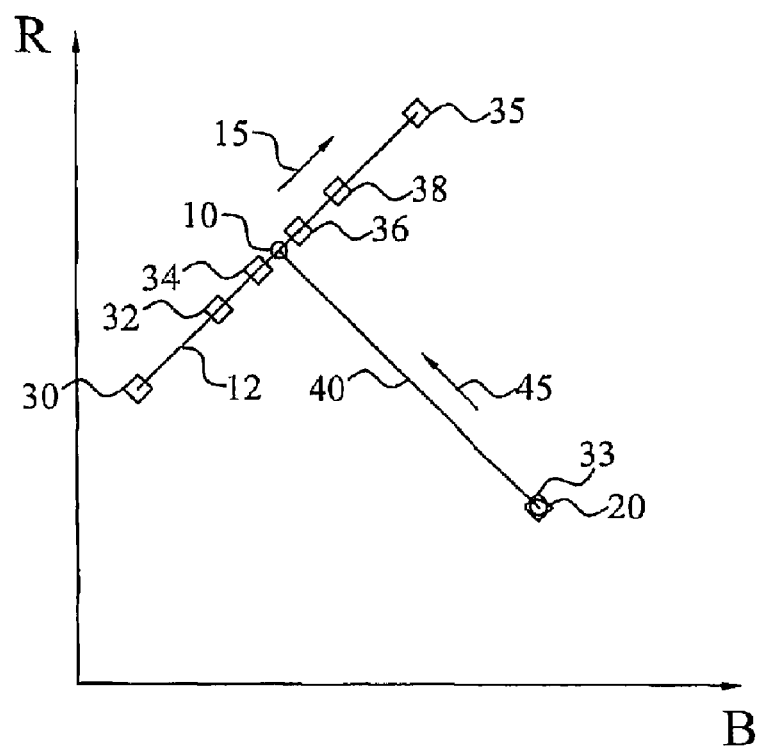
FIG. 11 is a diagram illustrating color representations that can be obtainable according to a further embodiment of the invention.

In the previously described diagrams, two color representations have been present on the second 12 line (and the third line 22 in the H mode) on either side of the first base color 10 (and second base color 20). The present invention is, however, not limited thereto. FIG. 11 illustrates this concept for the T mode, but can likewise be applied to the H mode of the present invention. In this illustrative example, three color representations 30, 32, 34, 35, 36, 38 are present on the second line 12 on either side of the first base color 10. This of course allows for more color representations 32, 34, 35, 36, 38 to select among for image elements having colors in this portion of the RGB space and therefore generally a higher obtainable image quality but at the higher bpp.

The different color representations 32, 34, 35, 36, 38 on the second line 12 can be equidistant from the first base color 10. In other words, a first color representation pair 34, 36 could be positioned at a distance of d from the first base color 10 (one color representation 34, 36 on either side of base color 10 on the line 12). A second color representation pair 32, 38 being positioned 2×d from the base color 10 and a third color representation pair 30, 35 being positioned at a distance of 3×d from the base color 10. In such a case, the color modifier codeword only needs to be a representation of d.

In an alternative approach, another distribution than equidistant is used for the color representations 32, 34, 35, 36, 38 positioned on the second line 12. In FIG. 11, a Gaussian-like distribution has been employed for the color representations 32, 34, 35, 36, 38 of the second line 12. This means that the distance between the color representations 32, 34, 35, 36, 38 and the first base color 10 increases for more distal color representations. In other words, the distance between the innermost color representations 34, 36 and the base color 10 is smaller than the distance between the second innermost color representations 38, 32 and the innermost color representation pair 34, 36, and so on.

This approach is particularly suitable for handling image blocks where the original image colors of image elements are clustered around a point in color space but some colors are positioned somewhat more distant to this point.

Figure 12:
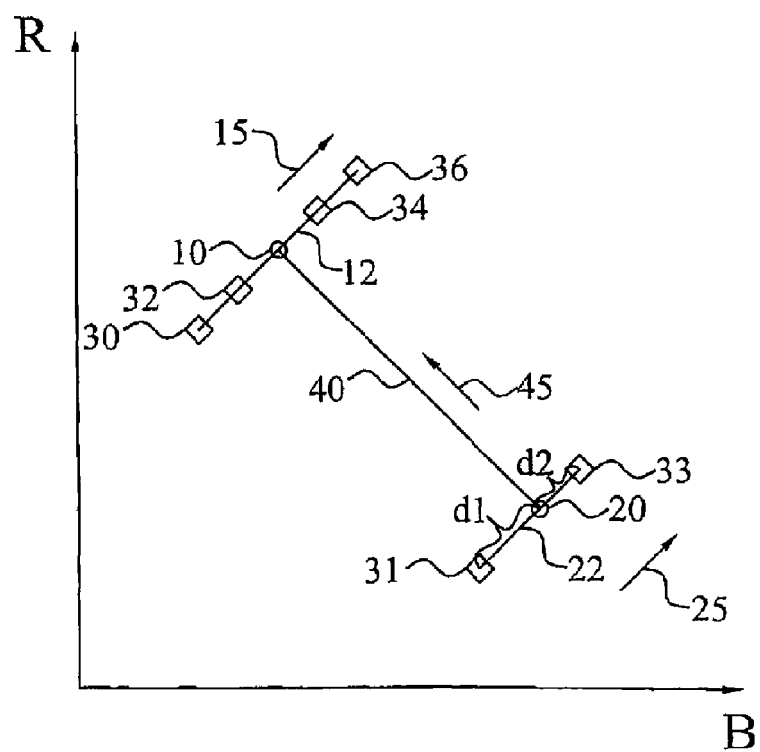
FIG. 12 is a diagram illustrating color representations that can be obtainable according to yet another embodiment of the invention.

In the previous figures, the color representations of a pair have been positioned with a same distance from the relevant base color but on either side of the base color on the line. The present invention is, however, not limited to such a solution. FIG. 12 illustrates a diagram showing an embodiment of the H mode of the present invention for which different color modifiers d1, d2 have been used for modifying the second base color 20 along the third line 22 to obtain a respective color representation 31, 33 on either side of the base color 20 on the line 22. Thus, if the line direction 25 is the luminance direction, a first color representation 31 has the following color values ($R_2$−d1, $G_2$−d1, $B_2$−d1) and the other color representation 33 has color values ($R_2$+d2, $G_2$+d2, $B_2$+d2).

This diagram also illustrates usage of more than two equidistant color representations 30, 32, 34, 36 obtainable by modifying a base color 10.

The teachings of the above-mentioned embodiments and implementations of the present invention, which are further illustrated in FIGS. 9-12, may be combined. For example, usage of different modifier values for the first and second base color or usage of more than two (equidistant or Gaussian-distributed) color representations obtainable from a single base color could be applied to non-parallel second and third lines. The person skilled in the art understands how such different combinations can be realized based on the discussion presented above and such combinations are therefore within the teachings of the present invention.

As has been discussed in the foregoing, the present invention is advantageously used as a complement or auxiliary mode to the iPACKMAN/ETC compression scheme [3, 4]. In such a case, the present invention will be used for compressing and decompressing image blocks having two distinct hues and chrominances. For other image blocks, iPACKMAN/ETC may instead be used or another auxiliary mode.

Figure 13:
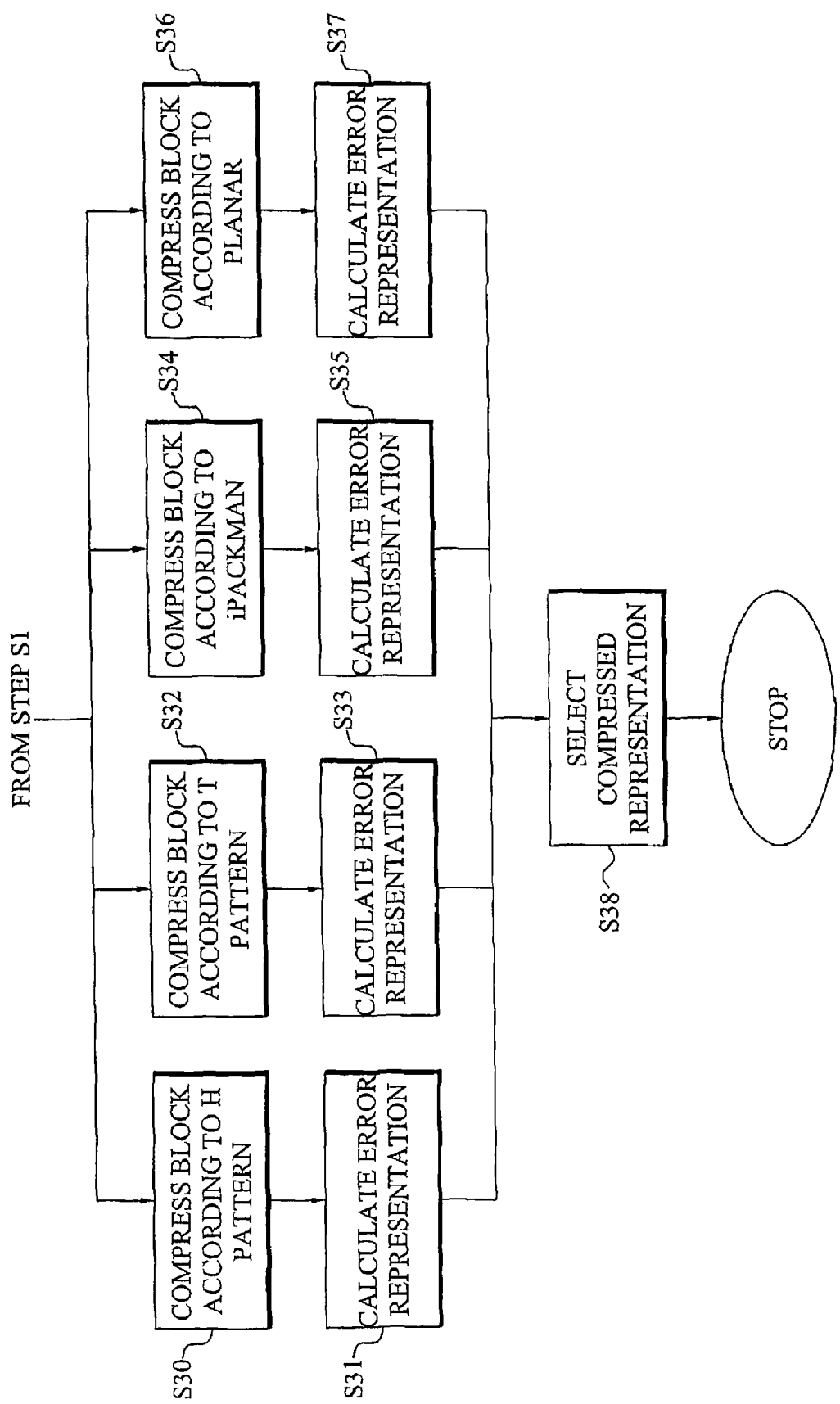
FIG. 13 is a flow diagram illustrating an embodiment of the providing and selecting steps of FIG. 1 in more detail for another multi-mode aspect of the invention.

FIG. 13 schematically illustrates such an implementation. The method continues from step S1 of FIG. 1. The provided image block to be compressed is then processed according to different schemes, typically in parallel. In other words, the image block is in step S30 compressed according to the H pattern or mode according to the present invention. This step S30 basically corresponds to step S20 of FIG. 7 and is not discussed further herein. In a next step S31, an error value representative of representing the image block with this first compressed block is estimated. In addition, the same image block is further compressed according to at least one other compression mode, three other modes in the figure. Thus, the image block is compressed according to the T mode of the present invention in a next step S32. This step S32 corresponds to the previously described step S22 of FIG. 7 and is not described further. A next step S33 calculates an error value representative of representing the image block as the compressed block obtainable according to the T mode.

In addition to this block compression according to the two different modes of the present invention, the image block is compressed according to the iPACKMAN/ETC mode in step S34. This compression mode involves determining a first color codeword as a representation of a first base color value. In addition, a second color codeword is also determined. However, this second codeword is a representation of a differential color. A second base color value is then obtainable as a sum of the first color value and the differential color. Image elements in a first sub-block (2×4 or 4×2 image elements) are assigned the first base color value whereas image elements in a second sub-block (2×4 or 4×2 image elements) are assigned the second base color value.

An intensity codeword is provided for the image block, where the intensity codeword is a representation of a set of multiple intensity modifiers. These intensity modifiers are applicable for modifying the intensity of the first or second base color value to generate multiple color representations. In a preferred implementation, the intensity codeword is a table index to an intensity table comprising multiple modifier sets, where the modifier sets have different intensity modifiers. Furthermore, an intensity index is selected for each image element in the block, where the intensity index is associated with an intensity modifier from the intensity modifier set represented by the intensity codeword.

A next step S35 calculates an error value representative of representing the image block as the compressed block obtainable according to the iPACKMAN/ETC mode.

Finally, the image block is preferably compressed according a compression mode denoted PLANAR and described in the reference [6] in step S36. This compression mode involves assigning color weights to at least a subset of the image elements in the image block. The color weights are preferably determined based on the relative positions the image elements of the at least one subset have in the image block. These color weights will be used during decompression for weighting different colors determined for the image block to generate color representations used for representing the original ("true") colors of the image elements.

The color weights are preferably assigned for each image element in at least one subset of the image elements in the blocks. In a first embodiment, the image block comprises N, such as 16, image elements, N is an integer larger than one, and the subset comprises M image elements, where $0 \leq M < N$. This means that no color weights are assigned for the remaining N-M image element(s). In that case, the original color of this (these) remaining image element(s) is represented by one of the color codewords to be determined for the image block. However, this basically corresponds to setting all component elements of one of the color weight vectors to 1 and setting all component elements of the other color weight vector(s) to 0.

Therefore, in another preferred implementation, color weights are assigned to all image elements in the block. In this embodiment, at least one of the color weights assigned to at least one image element is preferably different from 0, 1 and −1.

Thereafter, at least two color codewords are determined for the image block based on or using the assigned color weights. In a first embodiment of this compression mode, two color codewords are determined. However, in a preferred implementation of the present invention three, or sometimes four or more, color codewords are instead determined based on the color weights. These multiple codewords then represent three, four or more, color values. According to this compression mode, it is possible, by basing the color codeword determination on the assigned color weights, to determine color codewords resulting in high image quality and allowing generation of color representations having slowly varying color transitions.

The original colors of the multiple image elements in the block are represented (approximated) by color representations derivable from the at least two color values, in turn being represented by the at least two determined color codewords. In addition, color representations of the image elements in the at least one subset, i.e. those image elements for which color weights were assigned, are derivable from combinations of the at least two color values weighted by the assigned color weights.

If the at least one subset comprises a first subset of the image element in the block, the color representations of these image elements are derivable from combinations of the at least two color values weighted by the assigned color weights. However, color representations of image elements in a second remaining subset of the image elements in the block are selected directly from the color values and therefore do not constitute combinations of multiple color values.

In a currently preferred implementation of PLANAR, the color weights are preferably selected so that only a single image element in the block has color weights constituting of a 1 and the rest 0. This means that this single image element, preferably a corner image element, has its original color represented by a color value derived from only one of three color codewords, which are used in this implementation.

The way of positioning the color values for this implementation, results in the following formula for calculating the color representations and color weights of the image elements in the image block:

$$R(x, y) = \frac{x}{4}(R_H - R_O) + \frac{y}{4}(R_V - R_O) + R_O$$

$$G(x, y) = \frac{x}{4}(G_H - G_O) + \frac{y}{4}(G_V - G_O) + G_O$$

$$B(x, y) = \frac{x}{4}(B_H - B_O) + \frac{y}{4}(B_V - B_O) + B_O$$

-continued $$w_O^{xy} = 1 - \frac{x}{4} - \frac{y}{4}$$

$$w_H^{xy} = \frac{x}{4}$$

$$w_V^{xy} = \frac{y}{4}$$

where $(R_V, G_V, B_V)$, $(R_H, G_H, B_H)$, $(R_O, G_O, B_O)$ represent the three color codewords, R(x, y), G(x, y), B(x, y) represent the color representations for image element (x, y), x=0, 1, 2, 3 and y=0, 1, 2, 3, and $w_H^{xy}$, $w_V^{xy}$, $w_O^{xy}$ are the color weights for the three different color codewords for image element (x, y) in the image block. This means that the color representations of the image block illustrated in FIG. 2 will have red components according to Table 3 below.

TABLE 3 color representations

| $R_O$ | $\frac{3}{4}R_O + \frac{1}{4}R_H$ | $\frac{1}{2}R_O + \frac{1}{2}R_H$ | $\frac{1}{4}R_O + \frac{3}{4}R_H$ |
| --- | --- | --- | --- |
| $\frac{3}{4}R_O + \frac{1}{4}R_V$ | $\frac{1}{2}R_O + \frac{1}{4}R_H + \frac{1}{4}R_V$ | $\frac{1}{4}R_O + \frac{1}{2}R_H + \frac{1}{4}R_V$ | $\frac{3}{4}R_H + \frac{1}{4}R_V$ |
| $\frac{1}{2}R_O + \frac{1}{2}R_V$ | $\frac{1}{4}R_O + \frac{1}{4}R_H + \frac{1}{2}R_V$ | $\frac{1}{2}R_H + \frac{1}{2}R_V$ | $-\frac{1}{4}R_O + \frac{3}{4}R_H + \frac{1}{2}R_V$ |
| $\frac{1}{4}R_O + \frac{3}{4}R_V$ | $\frac{1}{4}R_H + \frac{3}{4}R_V$ | $-\frac{1}{4}R_O + \frac{1}{2}R_H + \frac{3}{4}R_V$ | $-\frac{1}{2}R_O + \frac{3}{4}R_V + \frac{3}{4}R_H$ |

The blue and green components are preferably handled in the same way, i.e. basically by exchanging $R_z$ with $B_z$ or $G_z$, where z=0, 1, 2, 3.

In a next step S37, an error value indicative of using this PLANAR compressed image block as representation of the image block is calculated.

Now four (or in alternative embodiments two, three or more than four) different compressed representation are available. In the next step S38, one of these four compressed representations is selected and used as compressed version of the current block. This selection step is performed based on the error values calculated in the steps S31, S33, S35 and S37. Thus, the compressed representation associated with the smallest error value will be selected in step S38. In a next optional step, a mode index representative of the compression mode used for generating the selected compressed representation is provided and is included in the compressed image block, i.e. in the bit sequence representing the image block. This procedure is preferably performed for each image block to be compressed. The method then ends.

This means that each image block of an image is preferably analyzed and compressed individually, which in most typical applications (depending on the actual image to be encoded), results in a mosaic of image blocks compressed according to the different modes. Thus, a first set of the image blocks is compressed according to the H mode, a second set of the blocks is compressed according to the T mode, a third block set is compressed according to the iPACKMAN/ETC mode and a fourth block set is compressed according to the PLANAR mode. For other applications only one, two or three of the modes will be used for the different image blocks.

In this embodiment, a compressed candidate block is generated per available compression mode. However, in another embodiment, the selection of compression mode to use for a current is block is performed prior to the actual block compressions. In such a case, a first analyzing step is performed where the original colors of the image elements in the block and in particular their distribution in color space is investigated and analyzed. The selection of compression mode is performed based on this analysis.

This embodiment is possible since the different available compression modes are particularly suitable and effective for given block types. For example, the PLANAR scheme is effective in handling blocks with slowly varying color transitions. The iPACKMAN/ETC scheme is very efficient for handling image blocks where the colors of the image elements have rather similar chrominance but varying luminance. The present invention is adapted for managing image blocks having two distinct chrominances (colors) and the two modes, T and H, handle different color group distributions.

This embodiment has the advantage that only one and not four compressed candidate blocks need to be generated, though at the cost of a block and color analysis and a risk of selecting a non-optimal compression scheme.

Figure 14A:
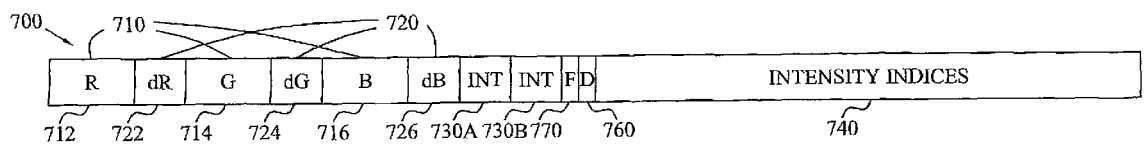
FIGS. 14A to 14D illustrate embodiments of encoded representation of an image block according to a multi-mode aspect of the present invention.

FIG. 14A schematically illustrates a possible compressed block representation 700 for the iPACKMAN/ETC differential mode. The compressed block 700 includes the first color codeword 710 including three color components, red 712, green 714 and blue 716, preferably each represented by five bits. The second color or differential color codeword 720 likewise includes three components, red 722, green 724 and blue 726, preferably each represented by three bits. The compressed block 700 further includes two intensity codewords 730A, 730B, one for each 2×4/4×2 sub-block, preferably each of 3 bits. A sequence 740 of intensity indices, preferably one 2-bit intensity index per image element in the block, is also included in the compressed block 700, resulting in 32 bits. A flipbit 770 defines whether the two sub-blocks of the image block is two 2×4 block or two 4×2 blocks, i.e. placed vertically flipbit=$0_{bin}$ or horizontally flipbit=$1_{bin}$. iPACKMAN/ETC comprises two so-called default modes, of which one has been described and disclosed in the present document. A diffbit 760 discriminates between these two default modes. In FIGS. 14A to 14D, this diffbit 760 is equal and set to $1_{bin}$ (or $0_{bin}$). Note that the mutual order of the codewords 710, 720, 730A, 730B, index sequence 740, flipbit 770 and diffbit 760 of the encoded image block 700 may differ from what is illustrated in the figure. The total size of the compressed block is 64 bits.

In the iPACKMAN/ETC mode mentioned above, the color components 712, 714, 716 of the first color codeword 710 preferably each comprises 5 bits, basically representing any value in the interval 0-31 ($00000_{bin}$-$11111_{bin}$). The components 722, 724, 726 of the second codeword 720 preferably each comprises 3 bits, which are used for representing a value in the interval −4 to +3. The color components of the second color value are obtainable by summing the components 712, 714, 716; 722, 724, 726 of the two codewords:

Red component=$R+dR$

Green component=$G+dG$

Blue component=$B+dB$

Since these color components represent intensity information, they are allowed to assume the values from 0 (no intensity) to 31 (full intensity). This means that bit combinations of the first color codeword 710 and the second color codeword 720 that result in that the additions R+dR, G+dG, B+dB will overflow, i.e. be <0 or >31 will never be used by the encoder operating in this iPACKMAN/ETC mode. This allows for introducing three auxiliary modes that can be used to complement iPACKMAN/ETC.

In the first auxiliary mode, the red component overflows, i.e. R+dR is smaller than zero or larger than 31. If this happens, the first three bits of the red component 712 of the first color codeword 710 are equal and different from the first bit of the red component 722 of the second color codeword 720.

Figure 14B:
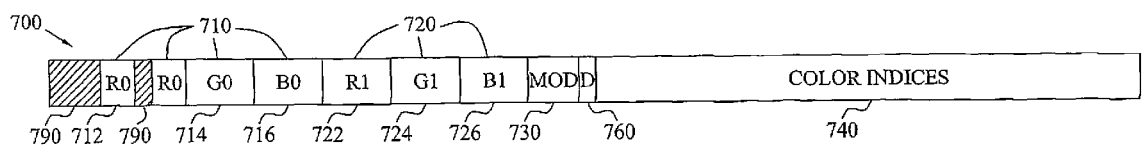

In FIG. 14B, this principle is employed for using the H-pattern/mode of present invention as an auxiliary mode to iPACKMAN/ETC. Thus, in this mode four bits 790 cannot be selected freely since the red components must overflow, and they must be either $1110_{bin}$ or $0001_{bin}$. The compressed block representation 700 is preferably in total 64 bits, of which four has been used according to above. The remaining 60 bits are preferably divided between the including parts according to; 4 bits are assigned to each color component 712, 714, 716; 722, 724, 726 of the first 710 and second 720 color codewords. The color modifier codeword 730 comprises three bits, the diffbit 760 one bit (which has the same value as in FIG. 14A) and the color index sequence 740 preferably 32 bits.

A second auxiliary mode is obtainable if the green component overflows, i.e. G+dG is smaller than zero or larger than 31 and the red component is not allowed to overflow, i.e. $0 \leq R+dR \leq 31$. In this mode, the first bit of the red component 712 of the first color codeword in FIG. 14A is set different from the second or third bit of the red component 712 making it impossible for the red component to overflow. In addition, the first three bits of the green component 714 of the first color codeword 710 must be equal and different from the first bit of the green component 724 of the second color codeword 720. In addition one should check that the green component actually overflows.

Figure 14C:
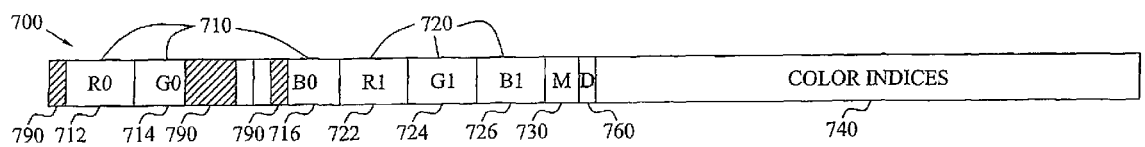

In FIG. 14C, bit0 (corresponds to first bit of red component in first color codeword in FIG. 14A), bit8-bit10 (correspond to three first bits of green component in first color codeword in FIG. 14A) and bit13 (corresponds to first bit of green component in second color codeword in FIG. 14A), collectively represented by 790 in the figure, cannot be set freely. Therefore, 59 bits remain to use for the other parts of the compressed block 700. These 59 bits are preferably used according to the T mode of the present invention. The division of bits among the color codewords 710, 720, color modifier codeword 730, diffbit 760 and color index sequence 740 is preferably the same as for FIG. 14C except that the color modifier codeword 730 in this case only comprises two bits instead of three.

A third auxiliary mode using the PLANAR mode scheme is available if the blue component overflows, i.e. B+dB is smaller than zero or larger than 31, but the red and green components are not allowed to overflow. This means that the first bit of the red 712 and green 714 component of the first color codeword 710 in FIG. 14A must differ from the second or third component in the red 712 and green 714 components. In addition, the blue component overflows, i.e. B+dB is smaller than zero or larger than 31.

Figure 14D:
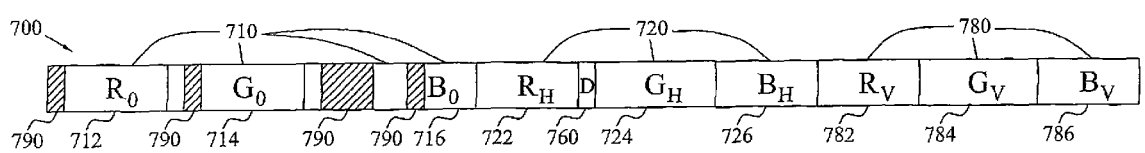

In FIG. 14D, therefore bit0 (corresponds to first bit of red component in first color codeword in FIG. 14A), bit8 (corresponds to the first bit of green component in first color codeword in FIG. 14A), bit16-bit18 (correspond to three first bits of blue component in first color codeword in FIG. 14A) and bit21 (corresponds to first bit of blue component in second color codeword in FIG. 14), collectively denoted 790, cannot be set freely. The red 712, 722, 782 and blue 716, 726, 786 components of three color codewords 710, 720, 730 are preferably assigned 6 bits each, whereas the corresponding green components 714, 724, 784 comprise 7 bits each and the diffbit 780 is one bit. This amounts, in total, to 64 bits.

If the four different compressed representations illustrated in FIGS. 14A-14D are possible, a mode index used for discriminating between the four modes preferably includes defined positions in the bit sequences. These bit positions include the first 710 and second 720 color codeword in FIG. 14A. In addition, the diffbit is preferably used to discriminate between the other available iPACKMAN/ETC mode. Note, however, that some of the bits of this mode index can be used for encoding the compressed block in the different modes.

Decompression

Figure 16:
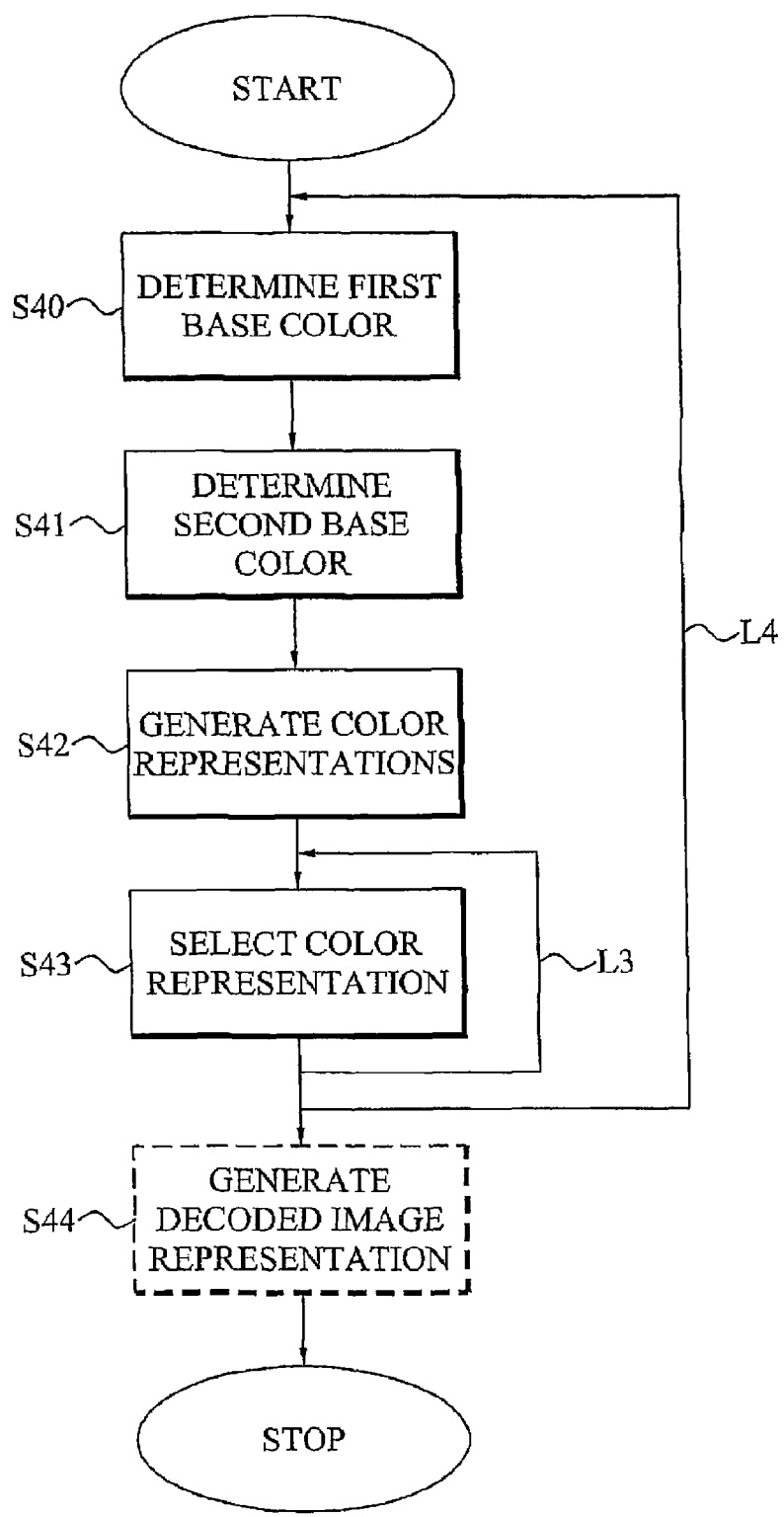
FIG. 16 is a flow diagram illustrating an image decoding method and a block decompression method according to the present invention.

FIG. 16 illustrates a flow diagram of a method of decoding an encoded image or encoded version of an original image according to the present invention. The encoded image basically comprises several encoded representations of image blocks. These encoded block representations are preferably generated by the image encoding method discussed above.

The method generally starts by identifying encoded image block(s) to decode. It could be possible that all encoded image blocks of an encoded image should be decoded to generate a decoded representation of the original image. Alternatively, only a portion of the original image is to be accessed. As a consequence, only a selected number of image blocks have to be decoded (or more precisely, a selected amount of image elements of certain image blocks have to be decoded).

Once the correct encoded (representation(s) of) image block(s) is identified, step S40 determines a first base color based on the first color codeword in the compressed block representation. A next step S41, likewise determines a second base color based on the second color codeword. These two determined base colors are located on a first line having a first direction in color space.

In a preferred implementation of the steps S40 and S41, the quantized colors of the color codewords, preferably 12 bits or 14 bits, is expanded or extended into, preferably, 24 bits. For the case with an RGB color and RGB444 color codewords, each quantized 4-bit color component of the color codewords is expanded into an 8-bit color component. This color expansion may be realized by multiplying the quantized 4-bit color components by 17 for an implementation with 256 different colors $$\left(\frac{256-1}{16-1}=17\right).$$

This is the same thing as replicating the 4-bit pattern to the first (top) and last (lower) 4 bits of the expanded 8-bit color word. In other words, a 4-bit color component of $1011_{bin}$ is expanded into $10111011_{bin}$.

In a next step S42 at least one color modifier is provided based on the color modifier codeword and used for modifying the first base color along a second line having a second direction in color space to obtain multiple color representations located on the second line. This second direction is different from the first direction.

The color modification can be realized by adding the provided at least one color modifier, or a derivate thereof, such as negation of the modifier value, to the first base color along the second direction. In a typical implementation, the second direction is the luminance direction [1, 1, 1], implying that the at least one modifier value is simply added to the three components of the base color or subtracted from the three color components. Instead of simply adding the modifier values, in some applications it could be preferred to weight the modifier value before adding it to the components. In such a case, different weights can be employed for the different color components. In an alternative embodiment, another type of modification than a simple addition could be employed, e.g. multiplication, XOR or another modification. In a next optional step, the resulting color-modified color component values are clamped between a minimum color threshold and a maximum color threshold. For example, if after adding the (possibly weighted) color modifier value to a color component, the resulting value is smaller than the minimum threshold, the value is clamped to the value of this threshold. Correspondingly, if the resulting value is larger than the maximum threshold, the value of the threshold should instead be used for that component. A non-limiting example of a minimum and maximum threshold is 0 and 255, respectively, for the case with 256 different color levels per color component.

In a next step S43, a color representation is selected from i) the multiple color representations along the second line generated in step S42 and ii) at least one color representation being based on the second base color. This representation selection is performed based on the color index sequence of the compressed image block and more precisely based on the color index assigned to the current image element to be decoded.

Step S43 could be performed for several image elements in the image block (schematically illustrated by line L3). It is anticipated by the invention that in some applications, only a single image element is decoded from a specific image block, multiple image elements of a specific image block are decoded and/or all the image elements of a specific block are decoded.

Steps S40 to S43 are then preferably repeated for all image blocks that comprise image elements that should be decoded (schematically illustrated by line L4). This means that the loop of steps S40 to S43 could be performed once, but most often several times for different encoded image blocks and/or several times for a specific encoded image block.

In the optional step S44, a decoded representation of the original image, or a portion thereof, is generated based on the decoded image elements and blocks. Note that in some applications, several image elements have to be decoded in order to render a single pixel of the decoded representation. For example, during trilinear interpolation, eight image elements are decoded and for bilinear interpolation the corresponding number is four image elements, which is well known to the person skilled in the art. The method then ends.

Figure 17:
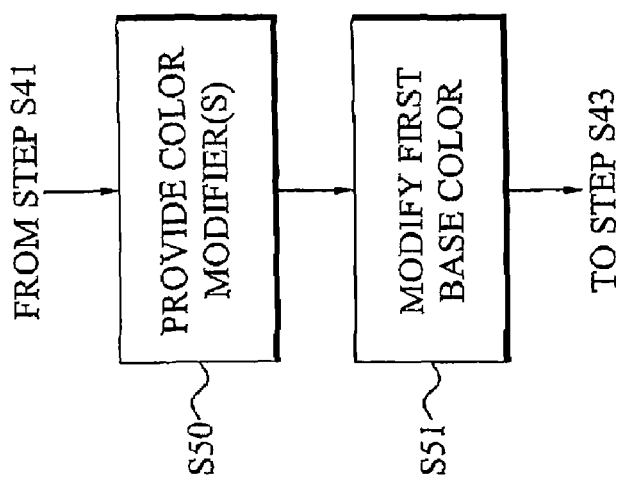
FIG. 17 is a flow diagram illustrating an embodiment of the generating step of FIG. 16 in more detail.

FIG. 17 is a flow diagram illustrating an embodiment of the generating step S42 of FIG. 16 in more detail. The method continues from step S41 of FIG. 16. In a next step S50, at least one color modifier is provided based on the color modifier codeword. This providing step can be realized by using the color modifier codeword as a table index for a table look-up procedure. In such a case, a modifier set comprising at least one color modifier is retrieved from the modifier table based on the modifier codeword. In another implementation, the color modifier codeword is a representation of a shift number to shift a defined bit combination. This means that the modifier codeword is then used for calculating the desired modifier value(s). The present invention also teaches embodiments in which the color modifier codeword itself basically is one or more color modifier values or quantized versions of such values.

In either case, the provided color modifier(s) is (are) used in a next step S51 for modifying the first base color along the second line to obtain the multiple color representations along the second line. In a first embodiment, the color modification involves adding the provided at least one modifier value, or a derivate thereof, such as a negation thereof or a weighted factor thereof, to the base color along the second line. If this second line has an associated direction vector equal to the luminance direction v=[1, 1, 1], the addition can be realized by simply adding the modifier value to each color component of the first base color. In other embodiments, where a luminance vector other than v=[1, 1, 1], such as v=[0.299, 0.587, 0.114], or a non-luminance direction vector is used for the second line, the color modification value can be regarded as a distance to travel along the second line from the base color.

In an embodiment, the color modifier codeword represents a single color modifier value. In such a case, this single modifier value is used for modifying the first base color along the second line to obtain the color representations. Multiple representations can be derived from such a single modifier value by, for example, adding the modifier value itself to the base color components to obtain a first color representation and adding a derivate of the modifier value, such as its negative counterpart, to the color components to achieve a second color representation.

In a second embodiment, the modifier codeword represents multiple color modifier values. In such a case, each such modifier value can be used for modifying the first base color for the purpose of obtaining at least one color representation. This means that there can then be a one-to-one or one-to-many (such as one-to-two) relation between the modifier values and the color representations.

In this context, the modifier values could be selected such that equidistant or non-equidistant (for instance Gaussian distributed) color representations will be available on the second line, as has been thoroughly described herein. In either case, the method then continues to step S43 of FIG. 16.

In another embodiment of the generating step of FIG. 16, a first set of multiple color representations are generated along the second line by modifying the first base color with the at least one color modifier represented by the modifier codeword. A second corresponding set of multiple color representations along a third line in color space is likewise generated by modifying the second base color with at least one color modifier represented by the modifier codeword. As has been described in the foregoing, this third line is different from the second line but may be parallel or non-parallel with the second line. In this context, the at least one color modifier used for modifying the second base color along the third line may be the same or a different modifier value(s) used for modifying the first base color. In the latter case, the color modifier codeword is preferably a representation of at least two color modifier values.

A color representation to use as original color approximation of an image element in the block is then selected, based on the color index sequence, from the first and second sets of multiple color representations.

Figure 18:
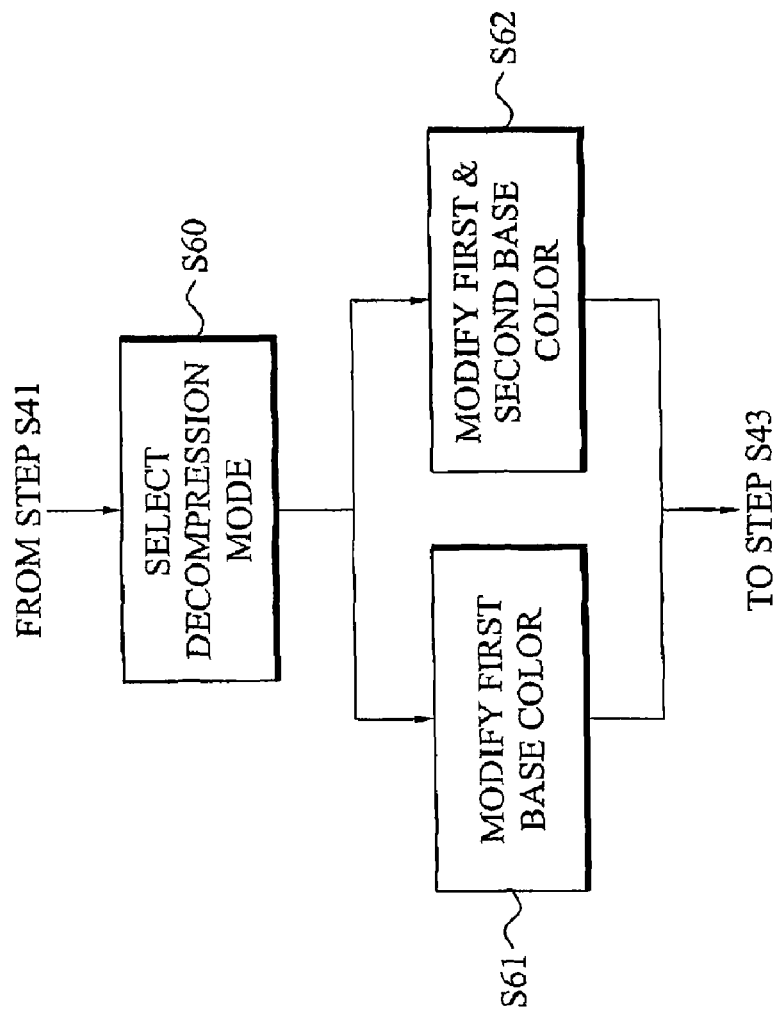
FIG. 18 is a flow diagram illustrating an embodiment of the generating step of FIG. 16 in more detail according to a multi-mode aspect of the present invention.

FIG. 18 is a flow diagram illustrating an embodiment of the generating step of FIG. 16 according to a multi-mode mode implementation of the present invention. In this multi-mode implementation, a first decompression mode is the previously presented T mode and a second decompression mode is the H mode. The method continues from step S41 of FIG. 16. In a next step S60, a selection mode to use for the current image block is selected. This mode selection is preferably performed based on a mode or pattern index included in the compressed representation of the image block. For example, a single bit could be used to discriminate between the T and H modes, with the mode bit equal to $1_{bin}$ representing a first of the modes and $0_{bin}$ representing the second mode.

If the T mode is selected in step S60, the method continues to step S61. This step S61 involves providing the at least one color modifier based on the modifier codeword and using the at least one modifier for generating multiple color representations along the second line in color space as previously described. The method then continues to step S43, where a color representation is selected for a current image element from i) the multiple color representations generated from the first base color, preferably including the first base color itself, and ii) the second base color, or a color representation generated therefrom.

If the selection step S60 instead leads to usage of the H mode for decompressing the current block as determined from the mode bit, the method continues to step S62. This step S62 involves i) modifying the first base color along the second line to obtain the first set of multiple color representations along the second line and ii) modifying the second base color along the third line to obtain the second set of multiple color representations. The method then continues to step S43 of FIG. 16, where a color representation is selected from the first and second sets based on a color index assigned to an image element to be decoded.

Figure 19:
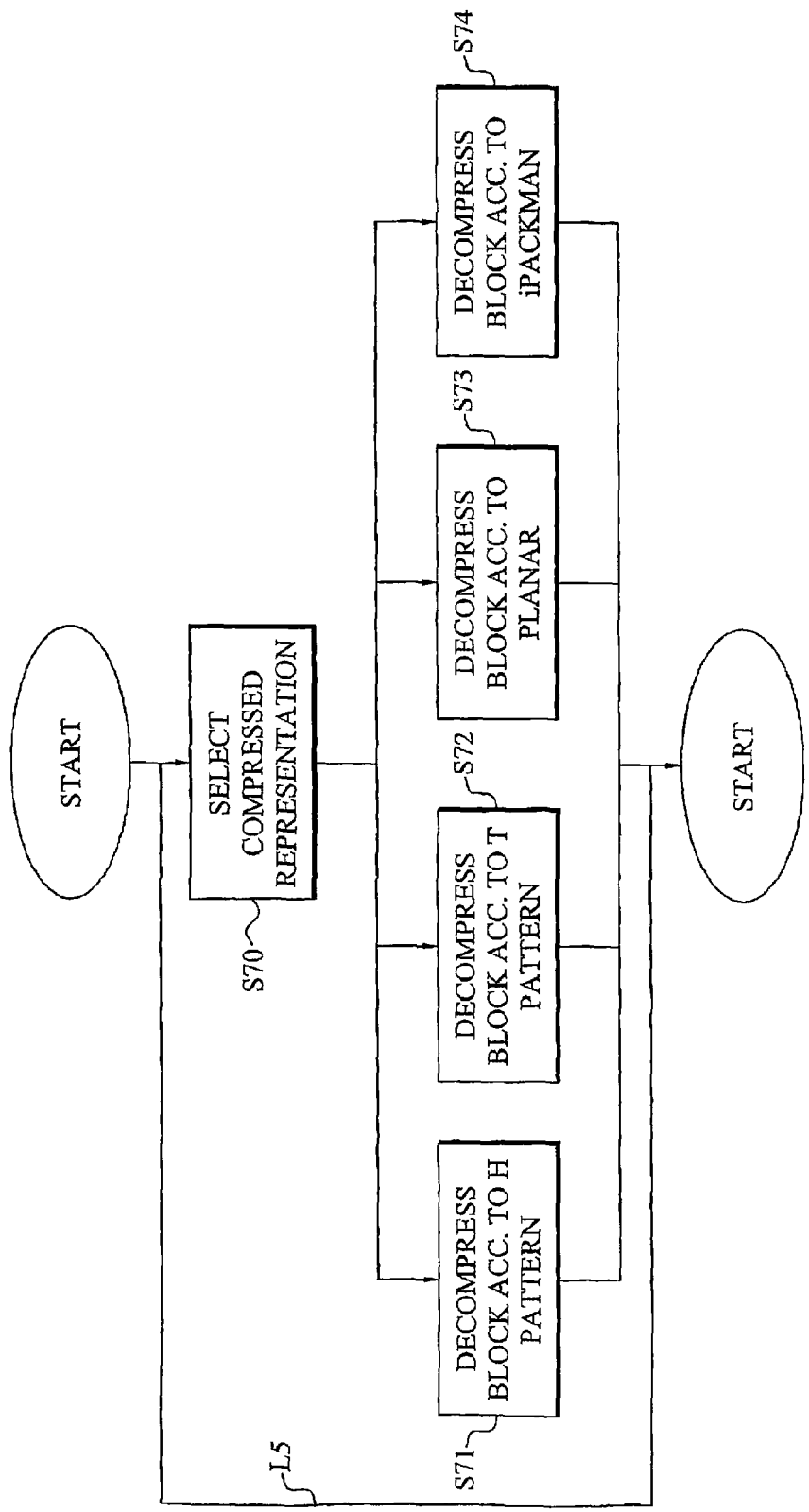
FIG. 19 is a flow diagram illustrating an embodiment of the generating step of FIG. 16 in more detail according to another multi-mode aspect of the present invention.

FIG. 19 is a flow diagram of another multi-mode implementation of the image and block decoding/decompression of the present invention. The method starts in step S70, where a decompression mode to use for the current block is selected based on a mode index. If the four different compressed representations illustrated in FIGS. 14A-14D are possible, the mode index includes the diffbit, the first color codeword and the second color codeword in FIG. 14A. Thus, the decoder investigates these bit positions in the bit sequence that constitutes the compressed block representation and selects which decompression mode based on the investigated bits. In a preferred implementation, the PLANAR decompression mode is selected if the blue color component overflows but not the red and greens. The H mode is selected if the red component overflows and the T mode of the invention is selected if the green component overflows but not the red. If none of the components overflow, the iPACKMAN/ETC decompression mode is selected in step S70.

If the H mode is selected in step S70, the method continues to step S71, where the block is decompressed according to this mode. This corresponds to performing the steps S40-S43 illustrated in FIG. 16, where the generating step S42 is performed as described in connection with step S62 of FIG. 18. If instead the T mode of the invention is selected in step S70, the method continues to step S72, where the block is decompressed according to the T mode of the invention. This step S72 basically corresponds to the steps S40 to S43 of FIG. 16 and where the generation step S42 is preferably performed as was described in the foregoing in connection with step S61 of FIG. 18.

The method continues from step S70 to step S73 if the PLANAR decompression mode is selected. This decompression mode involves determining at least two color values based on the at least two color codewords in the compressed block representations (see FIG. 14D). In a preferred implementation, this determining step involves expanding the quantized color of the color codeword, such as RGB676, into, preferably, 24 bits (RGB888). In a preferred implementation of PLANAR, the compressed block representation comprises three color codewords. This means that three color values are determined by extending each of the codeword. Thereafter, color weights assigned to the image element(s) to be decoded is provided. The color weights are preferably pre-defined weights, which depend on the actual position of the image element in the blocks:

$$w_O^{xy} = f_O(x,y)$$

$$w_H^{xy} = f_H(x,y)$$

$$w_V^{xy} = f_V(x,y)$$

Thus, all image blocks of the image compressed according to this PLANAR mode have preferably the same assignment of color weights so that an image element in, for example, position (2,1) in a first block will have the same color weights as an image element in position (2,1) in a second block if the two blocks have been compressed according to the PLANAR compression mode.

The color representation(s) used for representing the original color of the image element(s) to be decoded is (are) calculated based on the provided color weights and the determined at least two color values. In a preferred implementation, the color representation is calculated as weighted, using the provided weights, (linear) combination of the determined color values. In this context, all the color values are preferably used in the calculation, but it could be possible to use only a subset thereof.

Finally, the iPACKMAN/ETC decompression mode is utilized in step S74 if this mode is selected in step S70. The decompression involves determining a color value based on the first color codeword or the first and second color codeword. The color value is, if the image element to be decoded is present in a first (2×4/4×2) sub-block, determined based on the first color codeword, preferably by expanding the bit sequence of the codeword from RGB555 into RGB888. If the image element is instead is present in a second (2×4/4×2) sub-block, the color value is determined based on both the first and second color codeword, basically by adding the red components, green components and blue components of the first and second codewords and then expanding the result into RGB888 (or alternatively first expanding the codeword components and then adding them). The compressed block comprises, in this mode, two intensity codewords, one per sub-block. The intensity codeword assigned to the sub-block comprising the image element to be decoded is used to provide a set of multiple intensity modifiers. This preferably comprises providing, based on the intensity codeword, the modifier set from a table comprising multiple such modifier sets. An intensity modifier to use for the image element is selected from the provided modifier set based on the intensity index assigned to the image element. Thereafter, the determined color value is intensity modified by the selected modifier to generate a color representation for the image element and optionally clamped, if necessary, between the minimum and maximum allowed color component value.

The method then ends or a new image block is selected for decompression, which is schematically illustrated by the line L5.

DECOMPRESSION EXAMPLES

Herein follows decompression examples using a bit sequence layout as illustrated in FIGS. 14A to 14D.

iPACKMAN/ETC

The compressed image block is represented by the following bit sequence:
10110 010 11010 110 00100 000 101 110 1 1
10 01 11 00 01 01 10 11 10 00 11 00 01 01 00 01

Firstly, bit0-bit2, bit6, bit8-10, bit13, bit16-18, bit21 and the diffbit 760 are investigate to determine which decompression mode to use for this image block. Since none of the color components overflow and the diffbit 760 is set to 1, the differential default mode of iPACKMAN/ETC should be selected.

Firstly, the color components 712, 714, 716 of the first color codeword 710 are expanded into RGB888 to generate the first color value:

Red:$10110_{bin} \Rightarrow 10110101_{bin}=181$

Green:$11010_{bin} \Rightarrow 11010110_{bin}=214$

Blue:$00100_{bin} \Rightarrow 00100001_{bin}=33$

The differential components 722, 724, 726 of the second color codeword 720 are added to these components to obtain the second color value:

Red:$10110_{bin}+010_{bin}=11000_{bin} \Rightarrow 11000110_{bin}=198$

Green:$11010_{bin}+110_{bin}=100000_{bin} \Rightarrow 0000010_{bin}=130$

Blue:$00100_{bin}+000_{bin}=00100_{bin} \Rightarrow 00100001_{bin}=33$

The flipbit is set to $1_{bin}$, which implies that the first color value is assigned to the eight image elements in the two uppermost rows of the 4×4 block, whereas the second color value is used for the eight image elements in the two lowest rows.

The two intensity codewords 730A, 730B point an intensity table, exemplified by Table 4 below:

TABLE 4 intensity table

| intensity codeword | $11_{bin}$ | $10_{bin}$ | $00_{bin}$ | $01_{bin}$ |
|---|---|---|---|---|
| $000_{bin}$ | −8 | −2 | 2 | 8 |
| $001_{bin}$ | −12 | −4 | 4 | 12 |
| $010_{bin}$ | −31 | −6 | 6 | 31 |
| $011_{bin}$ | −34 | −12 | 12 | 34 |
| $100_{bin}$ | −50 | −8 | 8 | 50 |
| $101_{bin}$ | −57 | −19 | 19 | 57 |
| $110_{bin}$ | −80 | −28 | 28 | 80 |
| $111_{bin}$ | −127 | −42 | 42 | 127 |

The first intensity codeword 730A applicable for image elements in the first 2×4 sub-block is $101_{bin}$, representing the intensity modifiers −57, −19, 19, 57. The second intensity codeword 730B instead represents the intensity modifiers −80, −28, 28, 80.

The first image element in position (0,0) has associated color index $10_{bin}$ and will have the following color representation:

(181,214,33)+(−19,−19,−19)=(162,195,14)

Correspondingly, the color representation of the last image element (in position (3,3)) has color index $01_{bin}$ and is calculated as follows:

(198,130,33)+(80,80,80)=(255,210,113)

after clamping the calculated color component values between the minimum allowed value of 0 and the maximum value of 255.

This procedure is then continues for the rest of the image elements in the image blocks.

H-Pattern of THUMB

The compressed image block is represented by the following bit sequence:
111 10 0 10 1101 0110 0010 0000 1011 101 1
10 01 11 00 01 01 10 11 10 00 11 00 01 01 00 01

In this case, the red component, when interpreting the bit sequence according to FIG. 14A, i.e. iPACKMAN/ETC, of the first color codeword is $11110_{bin}=30$ and the red component of the second color codeword is $010_{bin}=2$, implying that the red component overflows since 30+2=32>31 and a first auxiliary mode, i.e. THUMB H-pattern, should be used. The bit sequence presented above has the layout as illustrated in FIG. 14B.

The first and second color values are generated by expanding the components 712, 714, 716; 722, 724, 726 of the two color codewords 710, 720:

Red 0:$1010_{bin} \Rightarrow 0101010_{bin}=170$

Green 0:$1101_{bin} \Rightarrow 11011101_{bin}=221$

Blue 0:$0110_{bin} \Rightarrow 01100110_{bin}=102$

Red 1:$0010_{bin} \Rightarrow 00100010_{bin}=34$

Green 1:$0000_{bin} \Rightarrow 00000000_{bin}=0$

Blue 1:$1011_{bin} \Rightarrow 10111011_{bin}=187$

The first color value is, thus, (170, 221, 102) and the second value is (34, 0, 187).

The modifier codeword 730 $101_{bin}=5$ implies that the number $1_{bin}$ should be shifted five times leftwards to obtain $100000_{bin}=32$. This value is used to modify the two color values to obtain four color representations:

C0:(170,221,102)−(32,32,32)=(138,189,70)

C1:(170,221,102)+(32,32,32)=(202,253,134)

C2:(34,0,187)−(32,32,32)=(2,0,155)

C3:(34,0,187)+(32,32,32)=(66,32,219)

The first image element has color index $10_{bin}$, which implies that color representation C2 is used for this image element. This procedure is continued for the rest of image elements (index $00_{bin} \Leftrightarrow C0$, $01_{bin} \Leftrightarrow C2$, $10_{bin} \Leftrightarrow C2$ and $11_{bin} \Leftrightarrow C3$).

T-Pattern THUMB

The compressed image block is represented by the following bit sequence:
1 0110 010 111 1 0 0 100 0100 0001 0111 01 1
10 01 11 00 01 01 10 11 10 00 11 00 01 01 00 01

In this case, the green component overflows since the green component, when interpreting the bit sequence according to FIG. 14A, i.e. iPACKMAN/ETC, of the first color codeword is $11110_{bin}=30$ and the green component of the second color codeword is $010_{bin}=2$, implying that the green component overflows since 30+2=32>31. In addition, the red component does not overflow since bit0 is different from bit1. This means that a second auxiliary decompression mode in the form of T-pattern of THUMB should be selected and the bit sequence is interpreted as having the layout of FIG. 14C.

The two color values are calculated in the same way as above for the P-pattern:

Red 0:$0110_{bin} \Rightarrow 1100110_{bin}=102$

Green 0:0101$_{bin}$ ⇒ 01010101$_{bin}$=85

Blue 0:0100$_{bin}$ ⇒ 01000100$_{bin}$=68

Red 1:0100$_{bin}$ ⇒ 01000100$_{bin}$=68

Green 1:0001$_{bin}$ ⇒ 00010001$_{bin}$=17

Blue 1:0111$_{bin}$ ⇒ 01110111$_{bin}$=119

In this case the color modifier 730 includes only two bits $01_{bin}$=1. If the same number $1_{bin}$ as the H-mode should be shifted, only relatively small color modifier values are attainable (from 0 to 8). Therefore, in this case another bit sequence representing a higher number, such as 5 or 6, is preferably shifted. For example, the number $110_{bin}$=6 could be shifted leftward one step to obtain $1100_{bin}$=12. Two of the four possible color representations are calculated using this modifier value, whereas the other two representations are equal to the two color values:

C0:(102,85,68)

C1:(102,85,68)−(12,12,12)=(90,73,56)

C2:(102,85,68)+(12,12,12)=(114,97,80)

C3:(68,17,119)

The first image element has color index $10_{bin}$, which corresponds to C2. The procedure is then repeated for the rest of the image elements in the block.

Planar

The compressed image block is represented by the following bit sequence:
1 011001 0 0 101011 0 000 00 1 010 111001 1
1001110 001011 011100 0110001 010001

In this example, the blue component, when interpreting the bit sequence according to FIG. 14A, i.e. iPACKMAN/ETC, overflows since the blue component of the first color codeword is $00000_{bin}$=0 and the blue component of the second color codeword is $101_{bin}$=−3, implying that the blue component overflows since 0−3=−3<0. In addition, bit0 is different from bit1 (red does not overflow) and bit8 is different from bit9 (green does not overflow). As a consequence, PLANAR should be used.

In this example, three color values are calculated by expanding the color components 712, 714, 716; 722, 724, 726; 782, 784, 786 of the three color codewords 710, 720, 780 into RGB888.

$R_0$:011001$_{bin}$ ⇒ 1100101$_{bin}$=101

$G_0$:0101011$_{bin}$ ⇒ 01010110$_{bin}$=86

$B_0$:000010$_{bin}$ ⇒ 00001000$_{bin}$=8

$R_H$:111001$_{bin}$ ⇒ 11100111$_{bin}$=231

$G_H$:1001110$_{bin}$ ⇒ 10011101$_{bin}$=157

$B_H$:001011$_{bin}$ ⇒ 00101100$_{bin}$=44

$R_V$:011100$_{bin}$ ⇒ 01110001$_{bin}$=113

$G_V$:0110001$_{bin}$ ⇒ 01100010$_{bin}$=98

$B_V$:010001$_{bin}$ ⇒ 01000101$_{bin}$=69

These color values are then weighted and combined according to the teachings of Table 3 above. The color representation for the first image element (0,0) is simply the first value (101, 86, 8). The color representation for image element (1,0) is three fourths thirds of the first color value and one fourth of the second color value, i.e.

$$\frac{3}{4}(101, 86, 8) + \frac{1}{4}(231, 157, 44) = (133, 104, 17).$$

This procedure is continued for the rest of the image elements to provide a decoded representation of the image block.

Implementation Aspects

The image encoding (image block encoding) and image decoding (image block decoding or processing) scheme according to the present invention could be provided in a general data processing system, e.g. in a user terminal or other unit configured for processing and/or rendering images. Such a terminal could be a computer, e.g. PC, a game console or a thin client, such as a Personal Digital Assistance (PDA), mobile unit and telephone.

User Terminal

Figure 20:
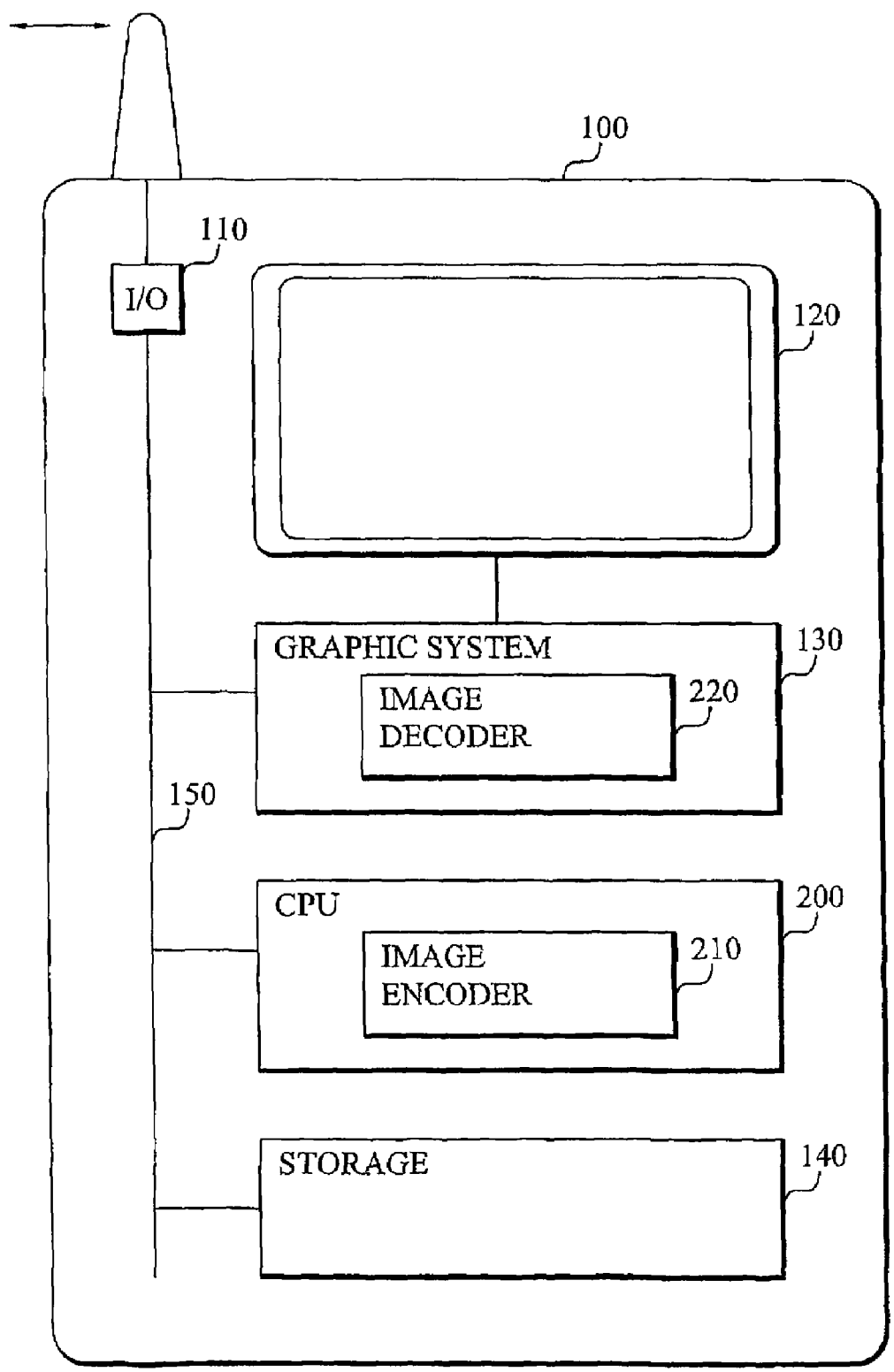
FIG. 20 schematically illustrates an example of a user terminal with an image encoder and decoder according to the present invention.

FIG. 20 illustrates a user terminal 100 represented by a mobile unit. However, the invention is not limited to mobile units but could be implemented in other terminals and data processing units, such as PC computers and game consoles. Only means and elements in the mobile unit 100 directly involved in the present invention are illustrated in the figure.

The mobile unit 100 comprises a (central) processing unit (CPU) 200 for processing data, including image data, within the mobile unit 100. A graphic system 130 is provided in the mobile unit 100 for managing image and graphic data. In particular, the graphic system 130 is adapted for rendering or displaying images on a connected screen 120 or other display unit. The mobile unit 100 also comprises a storage or memory 140 for storing data therein. In this memory 140 image data may be stored, in particular encoded image data (encoded image blocks) according to the present invention.

An image encoder 210 according to the present invention is typically provided in the mobile unit 100. This encoder 210 is configured for encoding an image or texture into an encoded representation of the image (or texture). As was discussed above, such an encoded representation comprises a sequence or file of multiple encoded image blocks. This image encoder 210 may be provided as software running on the CPU 200, as is illustrated in the figure. Alternatively, or in addition, the encoder 210 could be arranged in the graphic system 130 or elsewhere in the mobile unit 100.

An encoded representation of an image from the block encoder 210 may be provided to the memory 140 over a (memory) bus 150, for storage therein until a subsequent rendering of the image. Alternatively, or in addition, the encoded image data may be forwarded to an input and output (I/O) unit 110 for (wireless or wired) transmission to other external terminals or units. This I/O unit 110 can also be adapted for receiving image data from an external unit. This image data could be an image that should be encoded by the image encoder 210 or encoded image data that should be decoded. It could also be possible to store the encoded image representation in a dedicated texture memory provided, for example, in the graphic system 130. Furthermore, portions of the encoded image could also, or alternatively, be (temporarily) stored in a texture cache memory, e.g. in the graphic system 130.

An image decoder 220 according to the present invention is typically provided in the mobile unit 100 for decoding an encoded image in order to generate a decoded image representation. This decoded representation could correspond to the whole original image or a portion thereof. The image decoder 220 provides decoded image data to the graphic system 130, which in turn typically processes the data before it is rendered or presented on the screen 120. The image decoder 220 can be arranged in the graphic system 130, as is illustrated in the figure. Alternatively, or in addition, the decoder 200 can be provided as software running on the CPU 200 or elsewhere in the mobile unit 100.

The mobile unit 100 could be equipped with both an image encoder 210 and an image decoder 220, as is illustrated in the figure. However, for some terminals 100 it could be possible to only include an image encoder 210. In such a case, encoded image data could be transmitted to another terminal that performs the decoding and, possibly, rendering of the image. Correspondingly, a terminal 100 could only include an image decoder 220, i.e. no encoder. Such a terminal 100 then receives a signal comprising encoded image data from another entity and decodes it to generate a decoded image representation. Thus, the encoded image signal could be wirelessly be transmitted between terminals using radio transmitter and receiver. Alternatively, other techniques for distributing images and encoded image representations between terminals according to the invention could be employed, such as BLUETOOTH®, IR-techniques using IR ports and wired transferring of image data between terminals. Also memory cards or chips that can be connected and exchanged between terminals could be used for this image data inter-terminal distribution.

The units 110, 130, 200, 210 and 220 of the mobile unit 100 may be provided as software, hardware or a combination thereof.

Image Encoder

Figure 21:
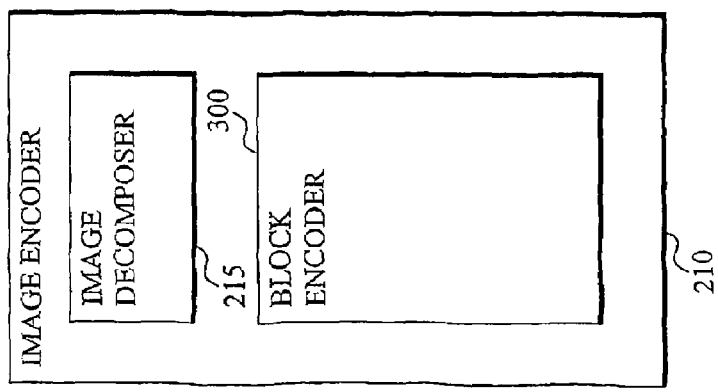
FIG. 21 is a block diagram schematically illustrating an embodiment of an image encoder according to the present invention.

FIG. 21 illustrates a block diagram of an embodiment of an image encoder 210 according to the present invention. The encoder 210 typically comprises an image decomposer 215 for decomposing or dividing an input image into several image blocks. The decomposer 215 is preferably configured for decomposing the image into image blocks comprising sixteen image elements (pixels, texels or voxels), i.e. having a general size of 4×4 image elements. This decomposer 215 could be adapted for decomposing different input images into image blocks with different sizes. In such a case, the decomposer 215 preferably receives input information, enabling identification of which image block format to use for a given image.

This embodiment of the image encoder 210 comprises a single block encoder 300. This block encoder 300 encodes the image block(s) received from the image decomposer to generate encoded block representation(s). The overall size of the block representation is smaller than the corresponding size of the uncoded image block. The block encoder 300 is preferably configured for processing (encoding) each image block from the decomposer 215 sequentially.

In an alternative implementation, the encoder 210 includes multiple block encoders 300 for processing multiple image blocks from the image decomposer 215 in parallel, which reduces the total image encoding time.

The units 215 and 300 of the image encoder 210 may be provided as software, hardware or a combination thereof. The units 215 and 300 may be implemented together in the image encoder 210. Alternatively, a distributed implementation is also possible with some of the units provided elsewhere in the mobile unit.

Block Encoder

Figure 22:
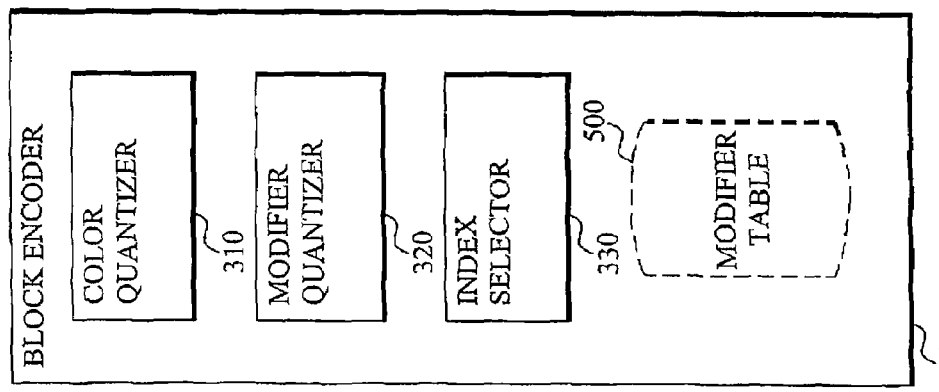
FIG. 22 is a block diagram schematically illustrating an embodiment of a block encoder according to the present invention.

FIG. 22 illustrates a block diagram of an embodiment of a block encoder 300 according to the present invention, such as the block encoder of the image encoder in FIG. 21. The encoder 300 comprises a color quantizer 310 that is arranged for determining a first color codeword as a representation of a first base color and for determining a second color codeword as a representation of a second base color. In addition, these two color representations represented by the codewords determined by the quantizer 310 are located on a first line having a first direction in color space. This color quantizer 22 preferably determines the two color codewords as quantized versions of the first and second base colors, for example as RGB444 or RGB554 versions of the RGB888 base colors.

A color modifier quantizer 320 is arranged in the block encoder 300 for providing a color modifier codeword. This provided color modifier codeword is a representation of at least one color modifier applicable for modifying the first base color and optionally (in the H mode) the second base color. Such a color modification is realized by modifying the first base color with the at least one color modifier along a second line having a second direction in color space. This second direction being different from the previously mentioned first direction, implying that the first and second lines are non-parallel.

In a typical implementation, the modifier quantizer 320 is implemented for providing the color modifier codeword as a table index pointing to or associated with a modifier set found in a modifier table 500 comprising multiple such different modifier set. The associated modifier set then comprises the at least one color modifier or quantized version(s) thereof. In such a case, the block encoder 300 preferably comprises or at least has access to the modifier table 500.

The block encoder 500 could comprise a single modifier table 500. Alternatively, several different tables could be arranged in the encoder 300, where the color modifiers of the tables are adapted for different image types or a table could be adapted for a specific image. For example, a first intensity table could be used during encoding of a first image type, e.g. photo, whereas a second table is used for encoding an image of a second type, e.g. text. In such a case, a table identifier is preferably included in the generated encoded image representation, which identifier allows identification of the modifier table 500 used for the current image. In this context, it is actually possible to include the table entries (color modifier values) in the generated encoded image representation or at least associating the table entries thereto. However, in order save memory, a single color modifier table 500 generated with training data from several different image types is preferably employed in the encoder 300.

In another implementation, the modifier quantizer 320 provides the color modifier codeword as shift number representing a number of times a bit combination is shifted to obtain the at least one color modifier.

It is also anticipated by the present invention that the modifier codeword provided by the color modifier quantizer 320 could actually represent the at least one modifier value itself or a quantized version thereof so that no table look-up procedure or bit shifting is required for determining the modifier value(s) from the codeword.

In this context, the color modifier codeword can be regarded as a representation of at least one distance to travel along the second line from the first base color to obtain, for each of the at least one distance, one or more, preferably two, color representations along the second line.

The color modifier codeword can represent multiple color modifiers or a single modifier. In the latter case, the multiple color representations along the second line can be obtained by determining further modification values from this single modifier, such as a negative version of the modifier or the modifier value multiplied with a defined factor.

The block encoder 300 also comprises an index selector 330 for selecting color indices for the image elements in the block to be compressed by the block encoder 300. This selector 330 selects, for an image element, a color index associated with or allowing identification of a color representation selected from i) the multiple color representations along the second line (obtainable by color modifying the first base color with the at least one color modifier) and ii) at least one color representation that is based on the second base color (such as the second base color itself or color representation(s) obtainable by color modifying the second base color along a third line in color space).

The selecting operation of the index selector 330 is preferably performed for all image elements in an image block, implying that each image element will be assigned a color index.

The units 310, 320, 330 and 500 of the block encoder 300 may be provided as software, hardware or a combination thereof. The units 310, 320, 330 and 500 may be implemented together in the block encoder 300. Alternatively, a distributed implementation is also possible with some of the units provided elsewhere in the image encoder.

Figure 23:
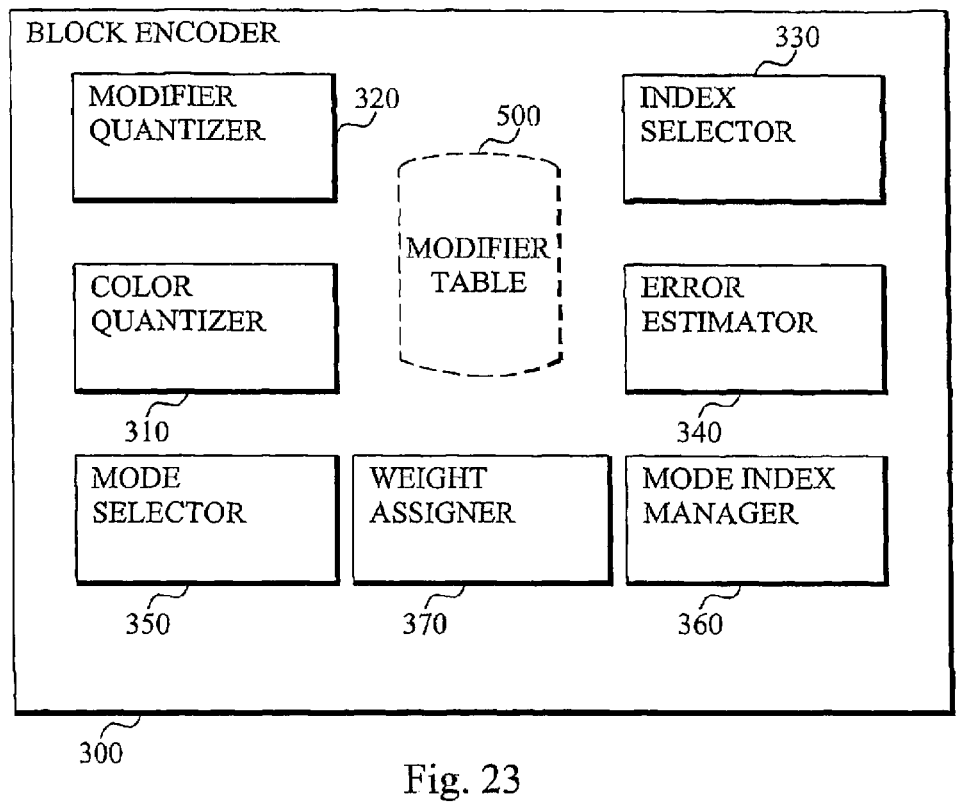
FIG. 23 is a block diagram schematically illustrating another embodiment of a block encoder according to the present invention.

In a preferred implementation, the block encoder 300 can be operated according to multiple different compression modes, such as the above-mentioned H and T modes. This is schematically illustrated by the block encoder embodiment 300 of FIG. 23.

In a first multi-mode implementation, the operation of the color quantizer 310 is similar to what was described in connection with FIG. 22, i.e. it determines the two color codewords. In the T operational mode, the at least one color modifier represented by the modifier codeword provided by the modifier quantizer 320 is used for modifying the first base color along the second line two obtain at least two color representations along this line. The index selector 330 then allows selection of a color index associated with i) these at least two color representations along the second line, ii) preferably the first base color, preferably also positioned on the second line, and iii) the second base color.

However, in the H mode, the modifier quantizer 320 is adapted for providing a color modifier codeword as a representation of i) at least one modifier applicable for modifying the first base color along the second line to obtain a first set of multiple color representations. The codeword is further a representation of ii) at least one modifier applicable for modifying the second base color along the third line to obtain a second set of multiple color modifiers along this third line. The third line being different from the second line but may have a same direction in color space as the second line. In addition, the direction of the third line being different from the direction of the above mentioned first line. The index selector 330 will select a color representation from i) the first set or ii) the second set. In this embodiment a same or different color modifiers can be represented in the modifier codeword for modifying the first and second base colors.

A mode selector 350 is then implemented for selecting which of the candidate representations that should be used as compressed representation for the image block. This selection is preferably performed based on a comparison of error estimates, one such estimate per compression mode. The block encoder 300 therefore preferably comprises an error estimator 340 for estimating an error value indicative of representing the image block with the T mode compressed block candidate and an error value for representing the block with the H mode compressed block. The candidate compressed block that leads to a smallest error is preferably selected by the mode selector 350. A mode index manager 360 then compiles a mode index representative of the compression mode resulting in the smallest error, i.e. the mode used when generating the candidate selected by the mode selector 350. This mode index constitutes a part of the compressed image block.

This block encoder embodiment can also be operated according to another multi-mode implementation, in which the H and T modes of the present invention are complemented by the iPACKMAN/ETC and the PLANAR compression modes.

In the iPACKMAN/ETC compression mode, the color quantizer 310 is operated for determining a first color codeword that is a representation of a first color value and for determining a second color codeword as a representation of a differential color, which can be added to the first color value to obtain a second color value. A modifier quantizer 330 is operated in this mode for determining at least one, preferably two, intensity codewords as representation of at least one set of multiple intensity modifiers used for modifying the first or second color value to obtain color representations. The intensity codewords are preferably table indices to a modifier table 500 comprising multiple such modifier sets. An index selector 330 is provided in the block encoder 300 for determining, for each image element in the block, an intensity index associated with one of the intensity modifiers in the modifier set(s) represented by the intensity codeword(s).

In the PLANAR mode, a weight assigner 370 assigns color weights to at least one subset of the image elements in an image block that is to be compressed. In a preferred implementation, the weight assigner 370 assigns N color weights per image element in the block, where N is a multiple number which is equal to the number of color codewords a color quantizer 310 determines for the image block. In another preferred embodiment, the assigner 370 assigns color weights to the image elements in a block so that color component values of at least one color component of color representations used for representing the original colors of the image elements change monotonically along a row or/and column of image elements in the block. The weight assignment performed by the assigner 370 of the block encoder 300 to image elements in a block is preferably conducted based on the position of the image elements, i.e. the relative coordinates of the image elements in the block.

The color quantizer 310 of the block encoder 300 is arranged, in this mode, for determining, based at least partly on the color weights assigned by the assigner 370, at least two color codewords for the image block. In a preferred implementation, the color quantizer 320 determines three color codewords, preferably three RGB676 codewords.

The error estimator 340 is then provided for calculating error values also for the iPACKMAN/ETC and PLANAR candidate compressed blocks so that the mode selector 350 receives four input error values and performs the made selection based on these error values.

The units 310 to 370 and 500 of the block encoder 300 may be provided as software, hardware or a combination thereof. The units 310 to 370 and 500 may be implemented together in the block encoder 300. Alternatively, a distributed implementation is also possible with some of the units provided elsewhere in the image encoder.

Image Decoder

Figure 24:
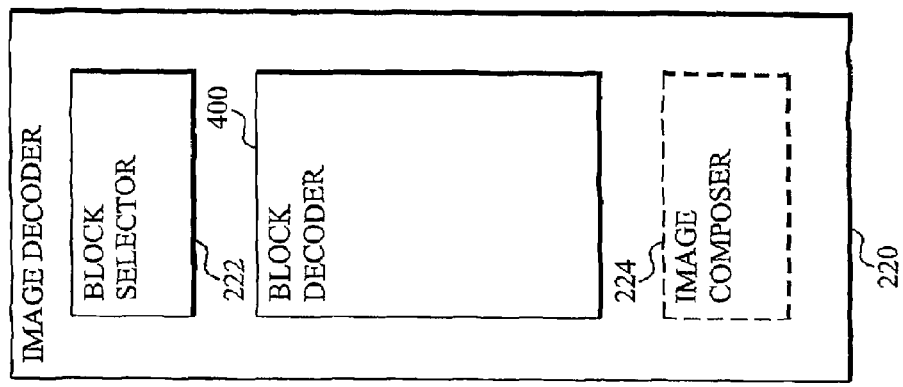
FIG. 24 is a block diagram schematically illustrating an embodiment of an image decoder according to the present invention.

FIG. 24 illustrates a block diagram of an embodiment of an image decoder 220 according to the present invention. The image decoder 220 preferably comprises a block selector 222 that is adapted for selecting, e.g. from a memory, which encoded image block(s) that should be provided to a block decoder 400 for decoding. The block selector 222 preferably receives input information associated with the encoded image data, e.g. from a header or a rendering engine. An address of an encoded image block having the desired image element(s) is then computed based on the input information. This computed address is preferably dependent upon the image-element (pixel, texel or voxel) coordinates within an image. Using the address, the block selector 222 identifies the encoded image block from the memory. This identified encoded image block is then fetched from the storage and provided to the block decoder 400.

The (random) access to image elements of an image block advantageously enables selective decoding of only those portions of an image that are needed. Furthermore, the image can be decoded in any order the data is required. For example, in texture mapping only portions of the texture may be required and these portions will generally be required in a non-sequential order. Thus, the image decoding of the present invention can with advantage by applied to process only a portion or section of an image.

The selected encoded image block is then forwarded to the block decoder 400. In addition to the image block, the decoder 400 preferably receives information specifying which image elements of the block that should be decoded. The information could specify that the whole image block, i.e. all image elements therein, should be decoded. However, the received information could identify only a single or a few of the image elements that should be decoded. The block decoder 400 then generates a decoded representation of the image element(s) in the block. This decoded representation is preferably a P-bit color, where P is the number of bits per image element in the original image, e.g. a 24-bit RGB color.

An optional image composer 224 could be provided in the image decoder 220. This composer receives the decoded image elements from the block decoder 400 and composes them to generate a pixel that can be rendered or displayed on a screen. This image composer 224 could alternatively be provided in the graphic system.

Alternatively, the image decoder 220 comprises multiple block decoders 400. By having access to multiple block decoders 400, the image decoder 220 can process (decode) multiple encoded image blocks in parallel. These multiple block decoders 400 allow for parallel processing that increases the processing performance and efficiency of the image decoder 220.

The units 222, 224 and 400 of the image decoder 220 may be provided as software, hardware or a combination thereof. The units 222, 224 and 400 may be implemented together in the image decoder 220. Alternatively, a distributed implementation is also possible with some of the units provided elsewhere in the user terminal.

Block Decoder

Figure 25:
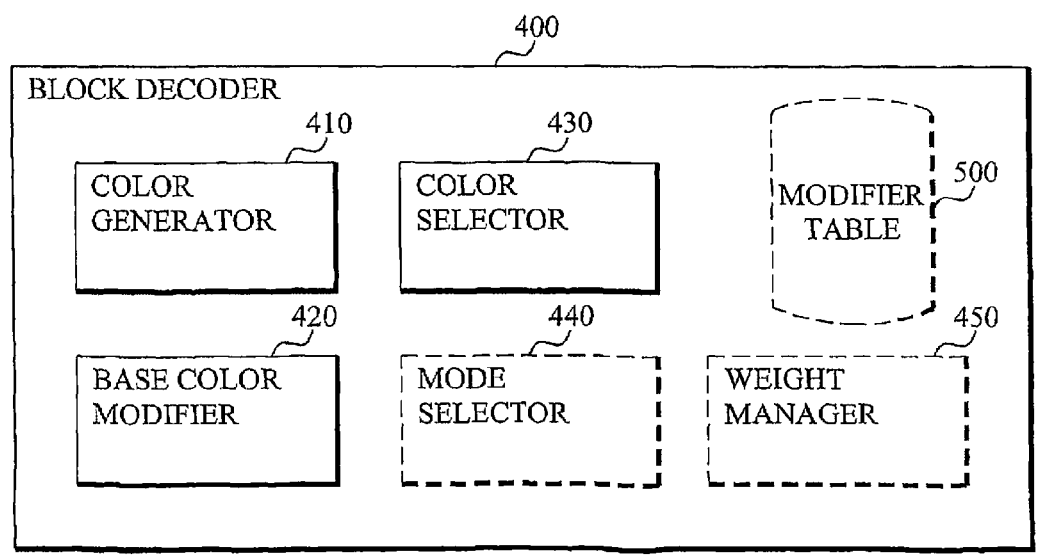
FIG. 25 is a block diagram schematically illustrating an embodiment of a block decoder according to the present invention.

FIG. 25 is an illustration of an embodiment of a block decoder 400 according to the present invention. The block decoder 400 comprises a color generator 410 adapted for generating a first color valued based on the first color codeword in the input compressed block sequence and for generating a second color value based on the second codeword. This color generation is preferably performed by expanding or extending the quantized codewords into RGB888 base color values. The two base colors are located on a first line having a first direction in color space.

In a first embodiment, the color generator 410 only generates the first or second base color depending on which image element in the block that should be decoded. In such a case, the color generator 410 or some other unit in the block decoder 400 performs this selection based on the color index assigned to that image element. However, in many cases multiple image elements need to be decoded from a same compressed image block, implying that it will be more process efficient to generate both base colors instead of performing the selection per image element.

A base color modifier 420 is implemented in the block decoder 400 for providing at least one color modifier based on the color modifier codeword. The color modifier 420 then generates multiple color representations along a second line having a second direction in color space by modifying the first base color with the at least one color modifier. In addition, this second direction is different from the first direction.

The color modifying action of the modifier 420 can be in the form of adding a color modifier value to each color component of the first base color value (implying a second direction equal to the luminance direction $v=[1, 1, 1]$). If the second direction is different than the luminance direction, the at least one modifier value can be regarded as at least one distance. In such a case, the color modifier 420 generates a color representation by traveling a distance defined be color modifier codeword along the second line starting from the first base color.

If the color modifier codeword is in the form of a modifier table index, the color modifier 420 preferably uses the codeword in a table 500 look-up procedure to retrieve a set comprising the at least one color modifier from a modifier table 500 implemented in the block decoder 400 or at least accessible for the base color modifier 420. If the codeword instead is in the form of a shift number, the color modifier 420 shifts a defined bit combination a number of times corresponding to this number to obtain a color modifier value. Other such modifier values can then be derived therefrom, as different factored or weighted versions of the modifier value.

The same discussion as was made above for block encoders regarding usage of one or multiple different color modifier tables 500 applies mutatis mutandis to the block decoder 400.

In a first embodiment (T mode), the color modifier 420 preferably modifies the first base color along the second line to obtain multiple color representations along that line. In another embodiment (H mode), in addition to this color modification of the first base color, the color modifier 420 also modifies the second base color along a third line with at least one color modifier value to obtain multiple color representations on the third line.

A color selector 430 of the block decoder 400 is provided for selecting, for at least one image element in the block and based on the color index sequence, a color representation from i) the multiple color representations along the second line and ii) at least one color representation based on the second base color.

According to the T mode, the color selector 430 performs the selection among i) the multiple color representations determined by the color modifier 420 along the second line, ii) preferably the first base color and iii) the second base color. In the H mode, the selector 430 is arranged for selecting among i) the multiple color representations along the second line and ii) the multiple color representations along the third line.

The block decoder 400 can operate according to multiple decompression modes. For example, the input compressed blocks can be compressed according to the H or T modes. In such a case, a mode selector 440 is preferably arranged in the block decoder 400 for determining which decompression mode to use for the current block based on a mode or pattern index contained in the compressed block. The mode selector 400 can then generate a mode signal that is provided to the other units in the block decoder 400 for affecting the operation. This mode signal is in particular provided to the color selector 430 for informing the selector 430 of which color representations are available for the current block.

In addition to the H and T modes, the block decoder 400 can preferably also be operated according to the iPACKMAN/ETC and PLANAR modes.

If the mode selector 440 selects the iPACKMAN/ETC decompression mode, the color generator 410 determines a color value based on the first color codeword or based on the first and second color codeword (depending on the actual position of the image element in the block). In the former case, the quantizer component colors are simply extended into preferably RGB888. In the latter case, the differential components of the second codeword are added to the color components from the first codeword and the sum is extended, e.g. to RGB888, to determine the color value. The color modifier 420 is operated in this mode for providing, based on one of the at least one intensity codewords, a set of multiple intensity modifiers, preferably from a modifier table 500. The color selector 430 selects, using an intensity index associated with the current image element, one of the intensity modifiers from the provided set. The color modifier 420 then uses this selected intensity modifier to intensity modify the color value to calculate a color representation for the image element.

If instead the mode selector 440 selects the PLANAR mode based on the mode index, the color generator 410 generates at least two color values based on the at least two color codewords in the compressed block representation. This color generator 410 is preferably configured for expanding or extending the quantized color components of the color codewords into, preferably, RGB888. A weight manager 450 is arranged in the block decoder 400 for providing, for each image element that should be decoded, color weights assigned to the image element(s). In a preferred implementation, corresponding image elements in a given position in different image blocks have the same assigned color weights. Thus, the color weights are dependent on the coordinates or positions of the image elements in the block but do not change for different blocks compressed according to the present invention. The weight manager 450 therefore preferably provides color weights based on image elements positions/coordinates in the image block.

The color modifier 420 uses the provided color weights and the generated color values for determining a color representation to use as an approximation of the original color of the image element. The modifier 420 is preferably implemented for combining the color values from the generator 410 but weighted with the color weights from the weight manager 450.

The units 410, 420, 430, 440, 450 and 500 of the block decoder 400 may be provided as software, hardware or a combination thereof. The units 410, 420, 430, 440, 450 and 500 may be implemented together in the block decoder 400. Alternatively, a distributed implementation is also possible with some of the units provided elsewhere in the image decoder.

Hardware Implementation

Figure 26:
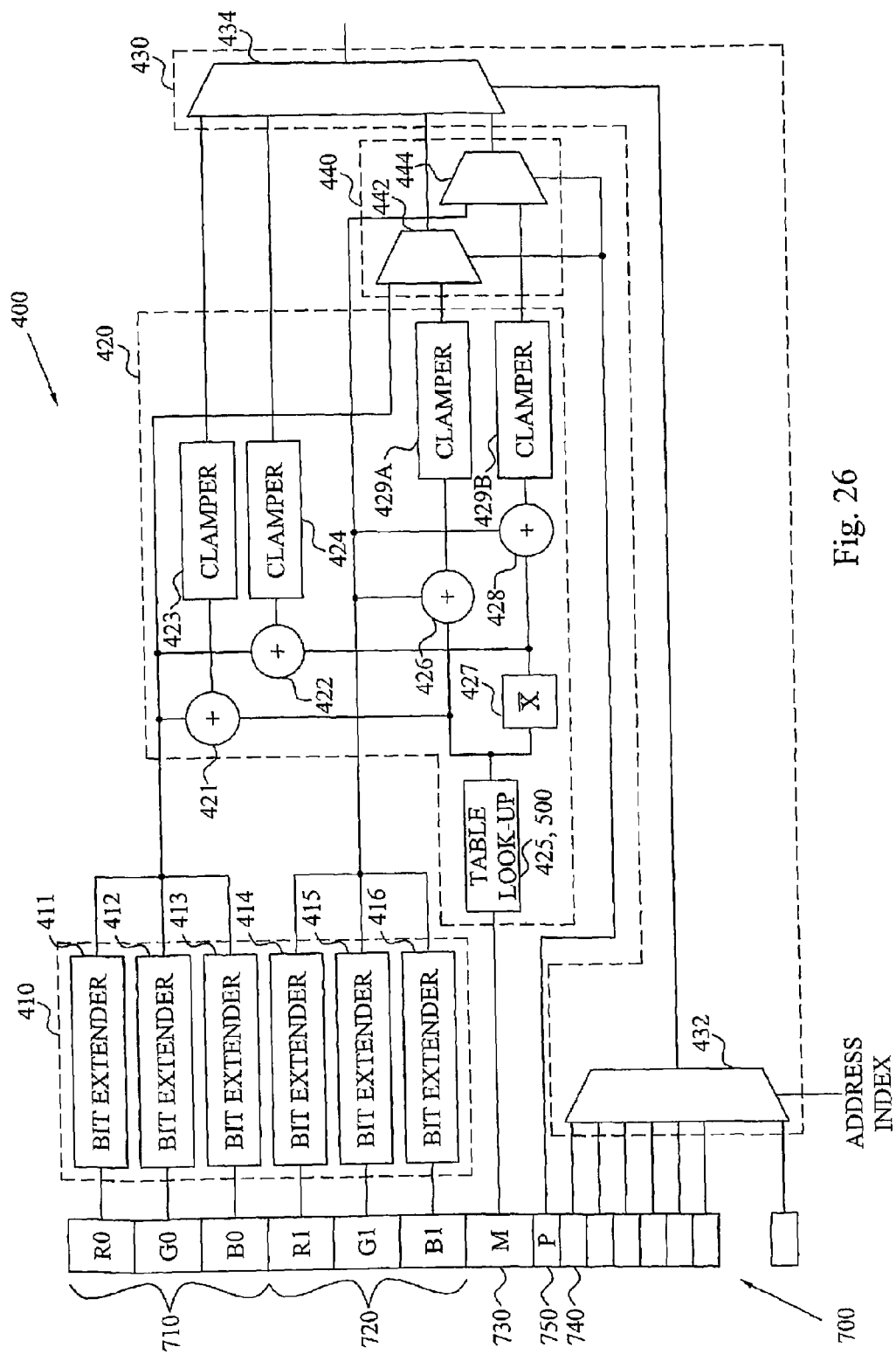
FIG. 26 is a hardware block diagram schematically illustrating an embodiment of a block decoder according to the present invention.

FIG. 26 schematically illustrates a possible hardware implementation of a block decoder 400 according to the present invention, which can be operated according to the H or T modes. The input to the block decoder 400 is an encoded block representation 700 comprising a 14-bit first color codeword 710 (5 bits for each of the red and green components and 4 bits for the blue component), a 14-bit second color codeword, a 3-bit color modifier codeword 730, a 1-bit mode index 750 and a 32-bit color index sequence 740.

The color codewords are provided to the color generator 410, which is realized by six bit extenders 411 to 416. A first bit extender 411 receives the red component of the first color codeword, a second 412 and third 413 extender receives the green and blue components of the first codeword, respectively. These three extenders 411 to 413 collectively generate the first base color. The remaining three bit extenders 414 to 416 handle the color components of the second codeword to generate the second base color. The output from respective extender 411 to 416 is an 8-bit color component. The five-to-eight bit extenders 411, 412, 414, 415 could be implemented by using a copy of the three most significant bits in the 5-bit color component as the three least significant bits of the resulting 8-bit color component. The four-to-eight bit extenders 413, 416 simply repeats the 4-bit color component pattern to obtain an 8-bit component output.

A table look-up 425 represents the color modifier table 500 of the block decoder. Using the input color modifier codeword the look-up 425 fetches the correct color modifier value from one of the modifier sets in the table, in this case a single modifier value is fetched. This modifier value is provided to a negation means 427 of the color modifier 420. The non-negated color modifier value is provided to two adders 421, 426. The first adder 421 adds the input modifier value to the first base color, which is output from the first three bit extenders 411 to 413. This addition is preferably performed by adding the modifier value to each color component of the first base color to generate a first color representation along a second line. The adder output is then forwarded to a clamper 423. This clamper 423 clamps the color components of the first color representation, if necessary, between 0 and 255.

A second color representation along the second line is obtained from a second adder 422, which receives the first base color and the negated color modifier value as input. The negated modifier value is added to the three components of the first base color to generate the second color representation, which is output to a second clamper 424.

Two other adders 426, 428 receive the second base color from the bit extenders 414 to 416 and the modifier value or the negated modifier values. The output from these two adders 426, 428 represent a third and a fourth color representation located on a third line in color space. These color representation values are likewise clamped between 0 and 255 by a respective clamper 429A, 429B.

The mode selector 400 is realized in this illustrative hardware implementation as two multiplexors 442, 440. The first multiplexor 442 receives the first base color from the bit extenders 411 to 413 and the third color representation from the clamper 429A. The multiplexor 442 uses the mode index 450 of the compressed block to select between these two color values. If the mode index indicates the T mode ($0_{bin}$), the multiplexor 442 outputs the first base color, otherwise, in the H mode, it outputs the third color representation.

The second multiplexor 444 receives the second base color from the extenders 414 to 416 and the fourth color representation as input. If the mode index indicates the T mode, the multiplexor 444 outputs the second base color. According to the H mode, the fourth color representation is instead output.

The first and second color representations along the second line in color space output form the clampers 423, 424 are forwarded together with the multiplexor outputs from the multiplexors 442, 444 to a multiplexor 434 constituting a part of the color selector 430 of the block encoder. The multiplexor 434 selects which of these four input color values to use as approximation/representation of the original color of an image element. In this selection, the multiplexor 434 receives a selection signal from a second multiplexor 432 of the color selector 430. A 4-bit address index is input to this second multiplexor 432. Based on the address index, the multiplexor 432 selects which of the sixteen image elements to decode. The 2-bit color index associated with the selected image element is then forwarded to the first multiplexor 434 and is used by the multplexor 434 for identifying the correct color value for that image element.

Figure 27:
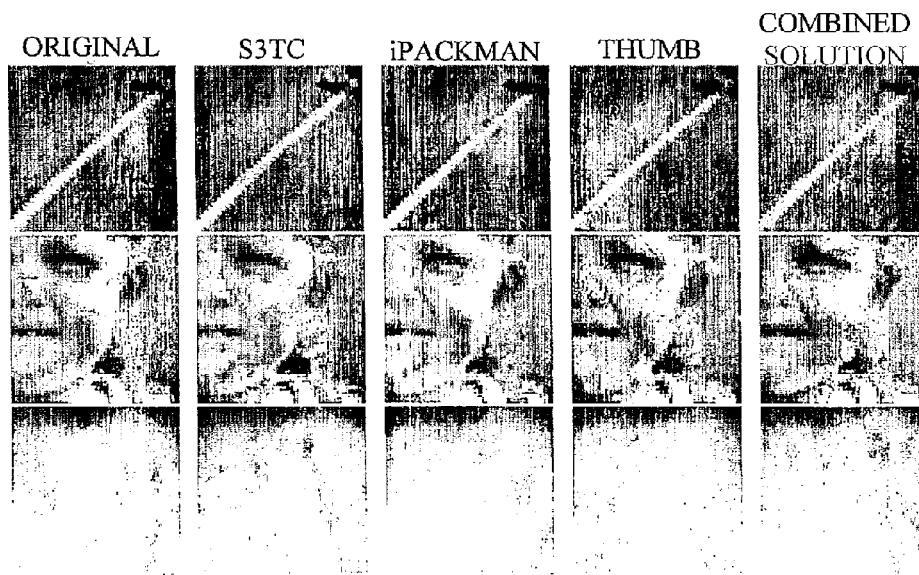
FIG. 27 is a comparison of images compressed according to the present invention with corresponding images compressed according to the prior art S3TC and iPACKMAN schemes.

The hardware solution for the block encoder 400 in FIG. 27 is very simple despite allowing a two-mode operation. It can be realized by relatively few standard components well known in the art.

Experimental Results

Experiments have been conducted for the purpose of comparing the image quality of different compression schemes. The two-mode implementation of the present invention (denoted THUMB herein) and the combined THUMB-iPACKMAN/ETC solution is compared to iPACKMAN and S3TC. In order to maximize image quality, the slowest compression mode of iPACKMAN has been used [3, 4]. THUMB is encoded with radius compression using the second level of radius. This is also the case for the THUMB-modes in the combined solution. S3TC is encoded using the Compressonator software package from ATI. The DirectX mode was used in this comparison, setting the weights to (1, 1, 1) for the lowest error score.

The results are presented as Peak Signal to Noise Ratio (PSNR).

The results of the comparison between the different schemes are found in Table 5. It can be seen that the combined solution outperforms S3TC with over 0.5 dB. Using THUMB separately is almost 1 dB worse than using the combined solution. The same number for iPACKMAN/ETC is only 0.21 dB. Generally in image coding, a difference below 0.25 dB is hard to notice.

TABLE 5

PSNR of different schemes

| | Kodak img. 1 | Kodak img. 2 | Kodak img. 3 | Kodak img 4 | Kodak img. 5 | Lena | Lorikeet | Avg. gain |
|---|---|---|---|---|---|---|---|---|
| S3TC | 34.78 | 36.86 | 38.53 | 37.96 | 32.80 | 35.97 | 34.37 | +0.61 |
| iPACKMAN | 36.29 | 38.09 | 38.62 | 38.59 | 34.12 | 35.17 | 33.25 | +0.21 |
| THUMB | 34.80 | 36.86 | 37.88 | 37.34 | 32.97 | 35.31 | 33.69 | +0.96 |
| Combined | 36.26 | 38.12 | 38.92 | 38.66 | 34.08 | 35.66 | 33.99 | — |

The rightmost column shows the average gain in dB when comparing the different compression schemes with the combined iPACKMAN-THUMB solution.

One particular goal with the present invention is to provide an image processing scheme that can handle the particular blocks that are most problematic for iPACKMAN/ETC. This goal is well achieved as is evident from FIG. 27. In this figure three examples of typical problem blocks are illustrated. Top: In this example, which shows a road, the main problem of iPACKMAN/ETC can be seen. Image blocks containing two distinct hues are not coded optimally. Middle: Here is an example of the strength of iPACMAN/ETC. Small transitions in luminance are coded well as can be seen around the eye and on the cheek. THUMB and S3TC have a more blocky appearance. A large image artifact can also be seen in the ear for S3TC. Since the combined solution inherits the strength of iPACKMAN/ETC, these blocks are coded well. Bottom: This last example is a cut-out of an explosion. Here S3TC performs best thanks to its linear interpolation between the base colors. As the blocks contain more than one hue, the result tends to be blocky for iPACKMAN. THUMB and the combined solution encode the image better even though some edges can be seen.

It will be understood by a person skilled in the art that various modifications and changes may be made to the present invention without departure from the scope thereof, which is defined by the appended claims.

REFERENCES

[1] U.S. Pat. No. 5,956,431
[2] International Patent Application No. WO 2005/059836
[3] International Patent Application No. WO 2006/006915
[4] Ström, Akenine-Möller: iPACKMAN high-quality, low complexity texture compression for mobile phones, *Graphics Hardware* 05, Los Angeles, USA, June 2005
[5] Y. Linde, A. Buzo and R. Gray, "An algorithm for vector quantizer design", *IEEE Transactions on Communications*, Vol. 28, pp. 84-94, January, 1980
[6] International Patent Application No. PCT/SE2006/000613

The invention claimed is:

1. A method of compressing an image block comprising multiple image elements, said method comprising the steps of:
    determining a first color codeword as a representation of a first base color;
    determining a second color codeword as a representation of a second base color, said first and second base color are located on a first line having a first direction in color space;
    providing a color modifier codeword as a representation of at least one color modifier applicable for modifying said first base color along a second line having a second direction in color space to obtain multiple color representations along said second line, said second direction being different from said first direction; and
    selecting, for each image element in said image block, a color index associated with a color representation selected from i) said multiple color representations along said second line and ii) at least one color representation based on said second base color.

2. The method according to claim 1, wherein said first base color is located on said second line and said second base color is located on a third line in color space, said third line being different from said second line and said at least one color representation based on said second base color being located on said third line.

3. The method according to claim 2, wherein said third line is parallel with said second line.

4. The method according to claim 1, wherein said second direction is a luminance direction in color space.

5. The method according to claim 1, wherein said providing step comprises providing a color modifier codeword as a representation of at least one distance to travel along said second line from said first base color to obtain, for each of said at least one distance, at least one color representation along said second line.

6. The method according to claim 1, wherein said providing step comprises providing a color modifier codeword as a representation of a number of times a bit combination is shifted to obtain said at least one color modifier.

7. The method according to claim 1, wherein said providing step comprises providing a color modifier codeword as a representation of a table index representing at least one color modifier from a modifier table comprising multiple color modifiers, said multiple color representations being obtainable by modifying, along said second line, said first base color by said at least one color modifier associated with said table index.

8. The method according to claim 1, wherein said providing step comprises providing a color modifier codeword as a representation of 1) at least one color modifier applicable for modifying said first base color along said second line to obtain a first set of multiple color representations along said second line and ii) at least one color modifier applicable for modifying said second base color along a third line in color space to obtain a second set of multiple color representation along said third line, said third line being different from said second line, and said selecting step comprises selecting, for each image element in said image block, a color index associated with a color representation selected from said first and second set of multiple color representations.

9. The method according to claim 1, wherein said providing step comprises providing a color modifier codeword as a representation of i) a first distance to travel along said second line from said first base color to obtain a first and a second color representation along said second line and ii) a second distance to travel along a third line from said second base color to obtain a third and a fourth color representation along said third line, said third line being different from said second line, and said selecting step comprises selecting, for each image element in said image block, a color index associated with a color representation selected from said first, second, third and fourth color representation.

10. The method according to claim 9, wherein said first distance being equal to said second distance.

11. The method according to claim 1, wherein said providing and selecting step comprises the steps of:
generating a first compressed image block of said image block by:
providing a color modifier codeword as a representation of said at least one color modifier applicable for modifying said first base color along said second line to obtain said multiple color representations a long said second line; and
selecting, for each image element in said image block, a color index associated with a color representation selected from said multiple color representations along said second line and a color representation based on said second base color;
generating a second compressed image block of said image block by:
providing a color modifier codeword as a representation of i) at least one color modifier applicable for modifying said first base color along said second line to obtain a first set of multiple color representations along said second line and ii) at least one color modifier applicable for modifying said second base color along a third line in color space to obtain a second set of multiple color representation along said third line, said third line being different from said second line; and
selecting, for each image element in said image block, a color index associated with a color representation selected from said first and second set of multiple color representations;
selecting said first or second compressed image block as compressed representation of said image block; and compressed image block.

12. The method according to claim 1, wherein said determining, providing and selecting step comprises the steps of:
generating a first compressed image block of said image block by:
determining said first color codeword as a representation of said first base color;
determining said second color codeword as a representation of a second base color;
providing said color modifier codeword as a representation of said at least one color modifier applicable for modifying said first base color along said second line to obtain said multiple color representations along said second line; and
selecting, for each image element in said image block, a color index associated with a color representation selected from said multiple color representations along said second line and a color representation based on said second base color;
generating a second compressed image of said image block by:
determining said first color codeword as a representation of said first base color;
determining said second color codeword as a representation of a second base color;
providing a color modifier codeword as a representation of i) at least one color modifier applicable for modifying said first base color along said second line to obtain a first set of multiple color representations along said second line and ii) at least one color modifier applicable for modifying said second base color along a third line in color space to obtain a second set of multiple color representation along said third line, said third line being different from said first line; and
selecting, for each image element in said image block, a color index associated with a color representation selected from said first and second set of multiple color representations;
generating a third compressed image of said image block by:
determining said first color codeword as a representation of said first base color;
determining said second color codeword as a representation of a differential color, wherein said second base color is obtainable as a sum of said first base color and said differential color;
providing at least one an intensity codeword as representation of a set of multiple intensity modifiers for modifying the intensity of said first or second base color to obtain multiple color representations;
selecting, for each image element in said image block, an intensity index associated with an intensity modifier from said intensity modifier set;
selecting said first, second or third compressed image block as compressed representation of said image block; and
providing a mode index associated with said selected first, second or third compressed image block.

13. A method of encoding an image, said method comprising the steps of:
decomposing said image into image blocks, each image block comprising multiple image elements; and
determining, for at least one image block, an encoded representation by compressing said at least one image block according to claim 1.

14. A method of processing a compressed representation of an image block comprising multiple image elements, said compressed representation comprising a first color codeword, a second color codeword, a color modifier codeword and a color index sequence, and said method comprising the steps of:
- determining a first base color based on said first color codeword;
- determining a second base color based on said second color codeword, said first and second base color are located on a first line having a first direction in color space;
- generating multiple color representations along a second line having a second direction in color space by modifying said first base color with at least one color modifier represented by said color modifier codeword, said second direction being different from said first direction; and for at least one image element in said image block:
- selecting, based on said color index sequence, a color representation from i) said multiple color representations along said second line and ii) at least one color representation based on said second base color.

15. The method according to claim 14, wherein said generating step comprises the steps of:
- providing said at least one color modifier based on said color modifier codeword; and
- modifying said first base color along said second line based on said provided at least one color modifier to obtain said multiple color representations along said second line.

16. The method according to claim 15, wherein said color modifier codeword is a table index representing at least one color modifier in a modifier table comprising multiple color modifiers and said providing step comprises selecting, based on said table index, said at least one color modifier from said modifier table.

17. The method according to claim 15, wherein said color modifier codeword is a representation of a shift number and said providing step comprises shifting a bit combination a number of times equal to said shift number to obtain said at least one color modifier.

18. The method according to claim 14, wherein said generating step comprises generating i) a first set of multiple color representations along said second line by modifying said first base color with at least one color modifier represented by said color modifier codeword and ii) a second set of multiple color representations along a third line in color space by modifying said second base color with at least one color modifier represented by said color modifier codeword, said third line being different from said second line, and said selecting step comprises selecting, for said at least one image element and based on said color index sequence, a color representation from said first and second set of multiple color representations.

19. The method according to claim 14, wherein said compressed representation further comprises a mode index and said method comprising the further step of selecting a decompression mode based on said mode index, said generating and selecting step comprises, if a first decompression mode is selected based on said mode index:
- generating said multiple color representations along said second line by modifying said first base color with at least one color modifier represented by said color modifier codeword; and for at least one image element in said image block:
- selecting, based on said color index sequence, a color representation from i) said multiple color representations along said second line and ii) a color representation based on said second base color, said generating and selecting step comprises, if a second decompression mode is selected based on said mode index:
- generating i) a first set of multiple color representations along said second line by modifying said first base color with at least one color modifier represented by said color modifier codeword and ii) a second set of multiple color representations along a third line in color space by modifying said second base color with at least one color modifier represented by said color modifier codeword, said third line being different from said second line; and for at least one image element in said image block:
- selecting, using said color index sequence, a color representation from said first and second set of multiple color representations.

20. The method according to claim 14, wherein said compressed representation further comprises a mode index and said method comprising the further step of selecting a decompression based on said mode index, said determining, generating and selecting step comprises, if a first decompression mode is selected based on said mode index:
- determining said first base color based on said first color codeword; determining said second base color based on said second color codeword, said first and second base color are located on said first line;
- generating said multiple color representations along said second line by modifying said first base color with said at least one color modifier represented by said color modifier codeword; and for at least one image element in said image block:
- selecting, based on said color index sequence, a color representation from i) said multiple color representations along said second line and ii) a color representation based on said second base color, said determining, generating and selecting step comprises, if a second decompression mode is selected based on said mode index:
- determining said first base color based on said first color codeword;
- determining said second base color based on said second color codeword, said first and second base color are located on said first line;
- generating i) a first set of multiple color representations along said second line by modifying said first base color with at least one color modifier represented by said color modifier codeword and ii) a second set of multiple color representations along a third line in color space by modifying said second base color with at least one color modifier represented by said color modifier codeword, said third line being different from said second line; and for at least one image element in said image block:
- selecting, based on said color index sequence, a color representation from said first and second set of multiple color representations, said determining, generating and selecting step comprises, if a third decompression mode is selected based on said mode index:
- determining said first base color based on said first color codeword;
- determining said second base color based on said first color codeword and second color codeword, said first and second base color are located on said first line;
- providing a set of multiple intensity modifiers based on said color modifier codeword; for at least one image element in said image block:

selecting an intensity modifier from said intensity modifier set based on said color index sequence; and generating a color representation by modifying the intensity of said first or second base color based on said selected intensity modifier.

21. A method of decoding an encoded image that comprises encoded representations of image blocks comprising multiple image elements, said method comprising the steps of:

processing compressed representations of image blocks according to claim 14 to a generate multiple color representations of image elements; and generating a decoded representation of said encoded image by composing said multiple color representations of image elements.

22. A system for compressing an Image block comprising multiple Image elements, said system comprising:

a first color quantizer for determining a first color codeword as a representation of a first base color;

a second color quantizer determining a second color codeword as a representation of a second base color, said first and second base color are located on a first line having a first direction in color space;

a modifier quantizer for providing a color modifier codeword as a representation of at least one color modifier applicable for modifying said first base color along a second line having a second direction in color space to obtain multiple color representations along said second line, said second direction being different from said first direction; and an index selector for selecting, for each image element in said image block, a color index associated with a color representation selected from i) said multiple color representations along said second line and ii) at least one color representation based on said second base color.

23. The system according to claim 22, wherein said modifier quantizer is adapted for providing a color modifier codeword as a representation of at least one distance to travel along said second line from said first base color to obtain, for each of said at least one distance, at least one color representation along said second line.

24. The system according to claim 22, wherein said modifier quantizer is adapted for providing a color modifier codeword as a representation of a number of times a bit combination should be shifted to obtain said at least one color modifier.

25. The system according to claim 22, wherein said modifier quantizer is adapted for providing a table index representing at least one color modifier from a modifier table comprising multiple color modifiers, said multiple color representations being obtainable by modifying, along said second line, said first base color by said at least one color modifier associated with said table index.

26. The system according to claim 22, wherein said modifier quantizer is adapted for providing a color modifier codeword as a representation of i) at least one color modifier applicable for modifying said first base color along said second line to obtain a first set of multiple color representations along said second line and ii) at least one color modifier applicable for modifying said second base color along a third line in color space to obtain a second set of multiple color representation along said third line, said third line being different from said second line, and said index selector is adapted for selecting, for each image element in said image block, a color index associated with a color representation selected from said first and second set of multiple color representations.

27. The system according to claim 22, wherein said system is adapted for generating a first compressed image block according a first compression mode and for generating a second compressed image block according to a second compression mode, said modifier quantizer is, in said first compression mode, adapted for providing a color modifier codeword as a representation of said at least one color modifier applicable for modifying said first base color along said second line to obtain said multiple color representations along said second line; and said index selector, is in first second compression mode, adapted for selecting, for each image element in said image block, a color index associated with a color representation selected from said multiple color representations along said second line and a color representation based on said second base color, and said modifier quantizer is, in said second compression mode, adapted for providing a color modifier codeword as a representation of i) at least one color modifier applicable for modifying said first base color along said second line to obtain a first set of multiple color representations along said second line and ii) at least one color modifier applicable for modifying said second base color along a third line in color space to obtain a second set of multiple color representation along said third line, said third line being different from said second line; and said index selector, is in first second compression mode, adapted for selecting, for each image element in said image block, a color index associated with a color representation selected from said first and second set of multiple color representations, said system further comprising:

a mode selector for selecting said first or second compressed image block as compressed representation of said image block; and a mode index manager for providing a mode index associated with a compression mode used for said compressed image block selected by said mode selector.

28. The system according to claim 22, wherein said system is adapted for generating a first compressed image block according a first compression mode, for generating a second compressed image block according to a second compression mode and for generating a third compressed image block according to a third compression mode, said first color quantizer is, in said first compression mode, adapted for determining said first color codeword as a representation of said first base color;

said second color quantizer is, in said first compression mode, adapted for determining said second color codeword as a representation of a second base color;

said modifier quantizer is, in said first compression mode, adapted for providing said color modifier codeword as a representation of said at least one color modifier applicable for modifying said first base color along said second line to obtain said multiple color representations along said second line; and said index selector is, in said first compression mode, adapted for selecting, for each image element in said image block, a color index associated with a color representation selected from said multiple color representations along said second line and a color representation based on said second base color, said first color quantizer is, in said second compression mode, adapted for determining said first color codeword as a representation of said first base color;

said second color quantizer is, in said second compression mode, adapted for determining said second color codeword as a representation of a second base color;

said modifier quantizer is, in said second compression mode, adapted for providing said color modifier codeword as a representation of i) at least one color modifier applicable for modifying said first base color along said second line to obtain a first set of multiple color representations along said second line and ii) at least one color modifier applicable for modifying said second base color along a third line in color space to obtain a second set of multiple color representations along said third line, said third line being different from said second line; and said index selector is, in said second compression mode, adapted for selecting, for each image element in said image block, a color index associated with a color representation selected from said first and second set of multiple color representations, and said first color quantizer is, in said third compression mode, adapted for determining said first color codeword as a representation of said first base color;

said second color quantizer is, in said third compression mode, adapted for determining said second color codeword as a representation of a differential color, wherein said second base color is obtainable as a sum of said first base color and said differential color;

said modifier quantizer is, in said third compression mode, adapted for providing at least one an intensity codeword as representation of a set of multiple intensity modifiers for modifying the intensity of said first or second base color to obtain multiple color representations;

said index selector is, in said third compression mode, adapted for selecting, for each image element in said image block, an intensity index associated with an intensity modifier from said intensity modifier set, said system further comprising:

a mode selector for selecting said first, second or third compressed image block as compressed representation of said image block; and a mode index manager for providing a mode index associated with a compression mode used for said compressed image block selected by said mode selector.

29. A system for encoding an image, said system comprising:

an image decomposer for decomposing said image into image blocks, each image block comprising multiple image elements; and a system according to claim 22 for determining, for at least one image block, an encoded representation by compressing said at least one image block.

30. A system for processing a compressed representation of an image block comprising multiple image elements, said compressed representation comprising a first color codeword, a second color codeword, a color modifier codeword and a color index sequence, and said system comprising:

a first color generator for determining a first base color based on said first color codeword;

a second color generator for determining a second base color based on said second color codeword, said first and second base color are located on a first line having a first direction in color space;

a base color modifier for generating multiple color representations along a second line having a second direction in color space by modifying said first base color with at least one color modifier represented by said color modifier codeword, said second direction being different from said first direction; and a color selector for selecting, for at least one image element in said image block and based on said color index sequence, a color representation from i) said multiple color representations along said second line and ii) at least one color representation based on said second base color.

31. The system according to claim 30, wherein said base color modifier is arranged for i) providing said at least one color modifier based on said color modifier codeword, and ii) modifying said first base color along said second line based on said provided at least one color modifier to obtain said multiple color representations along said second line.

32. The system according to claim 30, wherein said color modifier codeword is a table index representing at least one color modifier in a modifier table comprising multiple color modifiers and said base color modifier is arranged for selecting, based on said table index, said at least one color modifier from said modifier table.

33. The system according to claim 30, wherein said color modifier codeword is a representation of a shift number and said base color modifier is arranged for shifting a bit combination a number of times equal to said shift number to obtain said at least one color modifier.

34. The system according to claim 30, wherein said base color modifier is arranged for generating i) a first set of multiple color representations along said second line by modifying said first base color with at least one color modifier represented by said color modifier codeword and ii) a second set of multiple color representations along a third line in color space by modifying said second base color with at least one color modifier represented by said color modifier codeword, said third line being different from said second line, and said color selector is arranged for selecting, for said at least one image element and based on said color index sequence, a color representation from said first and second set of multiple color representations.

35. The system according to claim 30, wherein said compressed representation further comprises a mode index and said system comprises a mode selector for selecting a decompression based on said mode index, said base color modifier is arranged, in a first decompression mode, for generating said multiple color representations along said second line by modifying said first base color with said at least one color modifier represented by said color modifier codeword; and said color selector is arranged, in said first decompression mode, for selecting, for said at least one image element and based on said color index sequence, a color representation from i) said multiple color representations along said second line and ii) a color representation based on said second base color, and said base color modifier is arranged, in a second decompression mode, for generating i) a first set of multiple color representations along said second line by modifying said first base color with at least one color modifier represented by said color modifier codeword and ii) a second set of multiple color representations along a third line in color space by modifying said second base color with at least one color modifier represented by said color modifier codeword, said third line being different from said second line; and said color selector is arranged, in said second decompression mode, for selecting, for said at least one image element and based on said color index sequence, a color representation from said first and second set of multiple color representations.

36. The system according to claim 30, wherein said compressed representation further comprises a mode index and said system comprises a mode selector for selecting a decompression based on said mode index, said first color generator is arranged, in a first decompression mode, for determining said first base color based on said first color codeword;

said second color generator is arranged, in said first decompression mode, for determining said second base color based on said second color codeword;

said base color modifier is arranged, in said first decompression mode, for generating said multiple color representations along said second line by modifying said first base color with said at least one color modifier represented by said color modifier codeword; and said color selector is arranged, in said first decompression mode, for selecting, for said at least one image element and based on said color index sequence, a color representation from i) said multiple color representations along said second line and ii) a color representation based on said second base color, said first color generator is arranged, in a second decompression mode, for determining said first base color based on said first color codeword;

said second color generator IS arranged, In said second decompression mode, for determining said second base color based on said second color codeword;

said base color modifier is arranged, in said second decompression mode, for generating i) a first set of multiple color representations along said second line by modifying said first base color with at least one color modifier represented by said color modifier codeword and ii) a second set of multiple color representations along a third line in color space by modifying said second base color with at least one color modifier represented by said color modifier codeword, said third line being different from said second line; and said color selector is arranged, in said second decompression mode, for selecting, for said at least one image element and based on said color index sequence, a color representation from said first and second set of multiple color representations, and said first color generator is arranged, in a third decompression mode, for determining said first base color based on said first color codeword;

said second color generator is arranged, in said third decompression mode, for determining said second base color based on said first color codeword and second color codeword;

said base color modifier is arranged, in said third decompression mode, for providing a set of multiple intensity modifiers based on said color modifier codeword;

said color selector is arranged, in said third decompression mode, for selecting an intensity modifier from said intensity modifier set based on said color index sequence; and said base color modifier is further arranged, in said third decompression mode, for generating a color representation by modifying the intensity of said first or second base color based on said selected intensity modifier.

37. A system for decoding an encoded image that comprises encoded representations of image blocks comprising multiple image elements, said system comprising:

a processing system according to claim 30 for processing compressed representations of image blocks to a generate multiple color representations of image elements; and an image composer for generating a decoded representation of said encoded image by composing said multiple color representations of image elements.

38. A user terminal comprising a system according to claim 22.

* * * * *

UNITED STATES PATENT AND TRADEMARK OFFICE
CERTIFICATE OF CORRECTION

PATENT NO. : 8,144,981 B2  
APPLICATION NO. : 12/064207  
DATED : March 27, 2012  
INVENTOR(S) : Pettersson et al.

Page 1 of 1

It is certified that error appears in the above-identified patent and that said Letters Patent is hereby corrected as shown below:

On the Title Page, in Field (57), under "ABSTRACT", in Column 2, Line 13, delete "form" and insert -- from -- therefor.

In Fig. 19, Sheet 13 of 17, delete "  " and insert --  --, therefor.

In Column 1, Line 59, delete "quality:" and insert -- quality --, therefor.

In Column 6, Line 17, delete "of to" and insert -- of 0 to --, therefor.

In Column 15, Line 7, delete "ration" and insert -- ratio --, therefor.

In Column 19, Line 11, delete "x-0," and insert -- x=0, --, therefor.

In Column 27, Line 29, delete "$0000010_{bin}$" and insert -- $10000010_{bin}$ --, therefor.

In Column 28, Line 22, delete "$0101010_{bin}$" and insert -- $10101010_{bin}$ --, therefor.

In Column 28, Line 67, delete "$1100110_{bin}$" and insert -- $01100110_{bin}$ --, therefor.

In Column 38, Line 56, delete "form" and insert -- from --, therefor.

In Column 39, Line 2, delete "multplexor" and insert -- multiplexor --, therefor.

In Column 39, Line 54, delete "iPACMAN/ETC." and insert -- iPACKMAN/ETC. --, therefor.

In Column 41, Line 13, in Claim 8, delete "1)" and insert -- i) --, therefor.

In Column 41, Line 45, in Claim 11, delete "a long" and insert -- along --, therefor.

In Column 45, Line 18, in Claim 22, delete "Image" and insert -- image --, therefor.

In Column 45, Line 19, in Claim 22, delete "Image" and insert -- image --, therefor.

In Column 49, Line 24, in Claim 36, delete "IS arranged, In" and insert -- is arranged, in --, therefor.

Signed and Sealed this  
Fourteenth Day of August, 2012

David J. Kappos  
*Director of the United States Patent and Trademark Office*